United States Patent
Jeong et al.

(10) Patent No.: US 10,298,733 B2
(45) Date of Patent: May 21, 2019

(54) METHOD FOR EXECUTING FUNCTION OF ELECTRONIC DEVICE USING BIO-SIGNAL AND ELECTRONIC DEVICE THEREFOR

(71) Applicant: Samsung Electronics Co., Ltd., Gyeonggi-do (KR)

(72) Inventors: Dae-Ung Jeong, Gyeongsangbuk-do (KR); Hyou-Joo Kwon, Gyeonggi-do (KR); Tae-Han Lee, Seoul (KR); Won-Suk Choi, Seoul (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 108 days.

(21) Appl. No.: 15/233,264

(22) Filed: Aug. 10, 2016

(65) Prior Publication Data

US 2017/0142244 A1    May 18, 2017

(30) Foreign Application Priority Data

Nov. 12, 2015    (KR) .................. 10-2015-0159215

(51) Int. Cl.
```
H04W 68/02    (2009.01)
H04M 1/725    (2006.01)
H04W 4/90     (2018.01)
G06F 3/01     (2006.01)
G09G 5/30     (2006.01)
G06F 3/16     (2006.01)
```

(52) U.S. Cl.
CPC ........ *H04M 1/72519* (2013.01); *G06F 3/015* (2013.01); *G06F 3/017* (2013.01); *G09G 5/30* (2013.01); *H04W 4/90* (2018.02); *G06F 3/165* (2013.01); *G09G 2360/144* (2013.01); *H04M 2250/12* (2013.01)

(58) Field of Classification Search
CPC ........... H04M 1/7253; H04M 1/72569; H04M 19/04; H04M 1/725; H04M 2250/22; H04M 1/72519; H04M 2250/12; H04W 68/02
USPC .............................................. 455/458, 556.1
See application file for complete search history.

(56) References Cited

U.S. PATENT DOCUMENTS

| | | | |
|---|---|---|---|
| 2013/0217979 A1* | 8/2013 | Blackadar | A61B 5/0024 600/301 |
| 2013/0316686 A1* | 11/2013 | Subbaramoo | H04W 8/22 455/418 |
| 2014/0176518 A1* | 6/2014 | Min | G09G 3/20 345/207 |
| 2017/0049352 A1* | 2/2017 | Mirov | A61B 5/04085 |

FOREIGN PATENT DOCUMENTS

| KR | 10-2005-0120390 A | 12/2005 |
|---|---|---|
| KR | 10-0669048 B1 | 1/2007 |
| KR | 10-0833106 B1 | 5/2008 |
| KR | 10-2015-0044128 A | 4/2015 |

* cited by examiner

*Primary Examiner* — Fred A Casca
(74) *Attorney, Agent, or Firm* — Cha & Reiter, LLC.

(57) ABSTRACT

A method by an electronic device may include detecting a bio-signal related to a user of the electronic device from at least one biometric sensor of the electronic device, and switching a mode or controlling a volume of a communication session between the electronic device and another electronic device based on at least part of the bio-signal. Other embodiments are also possible.

22 Claims, 14 Drawing Sheets

METHOD FOR EXECUTING FUNCTION OF ELECTRONIC DEVICE USING BIO-SIGNAL AND ELECTRONIC DEVICE THEREFOR

CLAIM OF PRIORITY

This application claims the benefit under 35 U.S.C. § 119(a) of a Korean patent application filed in the Korean Intellectual Property Office on Nov. 12, 2015 and assigned Serial No. 10-2015-0159215, the entire disclosure of which is incorporated herein by reference.

TECHNICAL FIELD

The present disclosure relates to a method for executing a function of an electronic device using a bio-signal. For example, the present disclosure relates to a method for performing a call function, such as switching between receiver and speaker modes during the call, using a bio-signal and an electronic device thereof.

BACKGROUND

Recently, functionalities related to phone calls, i.e. voice communication sessions on mobile devices, have been improved. For example, improved functionalities include allowing the user to easily adjust the reception volume during the call, automatic voicemail, allowing the user to save a phone number during a call, the ability to record calls, etc. Further, recent mobile devices may be implemented to include sensors (e.g., a biometric sensor) for measuring a bio-signal of the user of the mobile communication terminal. If the bio-signal is measured, the mobile communication terminal may perform a function (e.g., a function to answer a call, a function to change an interface, or the like) corresponding to the measured bio-signal.

The recent electronic device, such as a recent mobile communication terminal, may be further implemented to have a touch protection function for preventing the liquid crystal display (LCD) of the device from being accidentally turn or of off during a call, thereby preventing unnecessary touch input. When the touch protection is in place during a call, the user may not freely switch the operation modes of the electronic device during the call because generally, the user needs to use the LCD screen to perform mode switching operations.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to provide an electronic device that can automatically switch from a receiver mode to a speaker mod or a video mode during a call or automatically switch from the speaker mode or the video mode to the receiver mode, using a value measured by a biometric or other sensors mounted in the electronic device, and an operation method thereof.

In accordance with an aspect of the present disclosure, a method by an electronic device may include detecting a bio-signal related to a user of the electronic device from at least one biometric sensor of the electronic device, and switching a mode or controlling a volume of a communication session between the electronic device and another electronic device based on at least part of the bio-signal.

In accordance with another aspect of the present disclosure, an electronic device may include at least one biometric sensor and a processor. The processor may be configured to detect a bio-signal related to a user of the electronic device using the at least one biometric sensor, and switch a mode or control a volume of a communication session between the electronic device and another electronic device based on at least in part of the bio-signal.

In accordance with further another aspect of the present disclosure, there is provided a storage medium storing instructions executed by at least one processor. The instructions may be set to allow the at least one processor to perform at least one operation including: detecting a bio-signal related to a user of an electronic device using at least one biometric sensor of the electronic device, and switching a mode or control a volume of a communication session between the electronic device and another electronic device based on at least part of the bio-signal.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
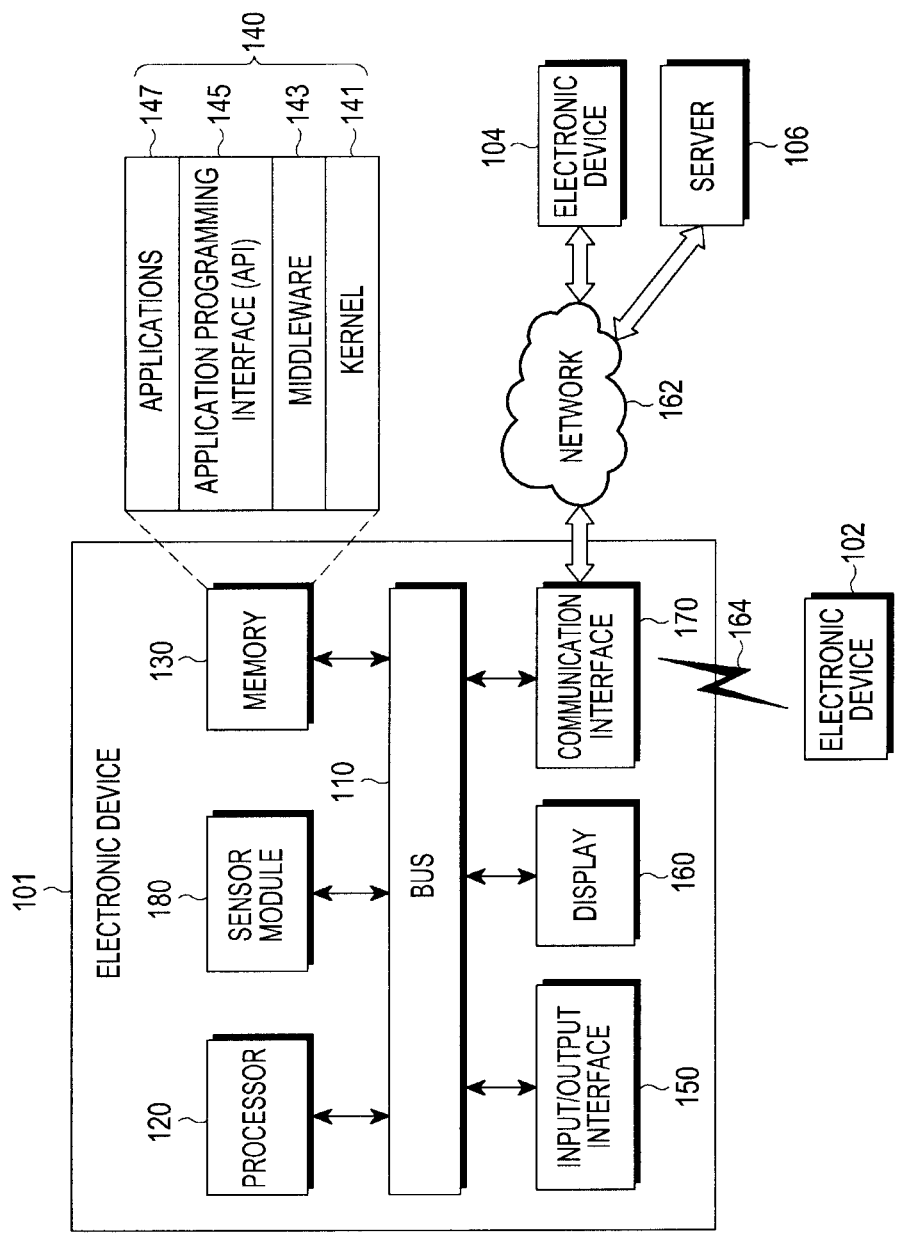
FIG. 1 is a diagram illustrating a network environment including an electronic device according to various embodiments of the present disclosure.

Hereinafter, various embodiments of the present disclosure will be disclosed with reference to the accompanying drawings. However, the present disclosure is not intended to limit the present disclosure to particular embodiments, and it should be construed as including various modifications, equivalents, and/or alternatives according to the embodiments of the present disclosure. In regard to the description of the drawings, like reference numerals refer to like elements.

In the present disclosure, an expression such as "having", "may have", "comprising", or "may comprise" indicates existence of a corresponding characteristic (such as an element such as a numerical value, function, operation, or component) and does not exclude existence of additional characteristic.

In the present disclosure, an expression such as "A or B", "at least one of A or/and B", or "one or more of A or/and B" may include all possible combinations of together listed items. For example, "A or B", "at least one of A and B", or "one or more of A or B" may indicate the entire of (1) including at least one A, (2) including at least one B, or (3) including both at least one A and at least one B.

Expressions such as "first", "second", "primarily", or "secondary", used in various exemplary embodiments may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element can be directly connected to the other element or can be connected to the other element through a third element. However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for", "having the capacity to", "designed to", "adapted to", "made to", or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a CPU or an application processor) that can perform a corresponding operation by executing at least one software program stored at an exclusive processor (such as an embedded processor) for performing a corresponding operation or at a memory device.

Terms defined in the present disclosure are used for only describing a specific exemplary embodiment and may not have an intention to limit the scope of other exemplary embodiments. When using in a description of the present disclosure and the appended claims, a singular form may include a plurality of forms unless it is explicitly differently represented. Entire terms including a technical term and a scientific term used here may have the same meaning as a meaning that may be generally understood by a person of common skill in the art. It may be analyzed that terms defined in general dictionaries among terms used herein have the same meaning as or a meaning similar to that of a context of related technology and are not analyzed as an ideal or excessively formal meaning unless explicitly defined. In some case, terms defined in the present disclosure cannot be analyzed to exclude the present exemplary embodiments.

An electronic device according to one embodiment of the present disclosure may include at least one of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device. In one embodiment, the wearable device may include at least one of an accessory-type wearable device (e.g., a watch, a ring, a bracelet, an anklet, a necklace, glasses, a contact lens, or a head mounted device (HMD)), a fabric/clothing-integrated wearable device (e.g., electronic clothing), a body-mounted wearable device (e.g., a skin pad or tattoo), or a bio-implantable wearable device (e.g., a implantable circuit).

In some embodiments, the electronic device may be a home appliance. The home appliance may include at least one of, for example, a television (TV), a digital video disk (DVD) player, an audio player, a refrigerator, an air conditioner, a cleaner, an oven, a microwave oven, a washer, an air purifier, a set-top box, a home automation control panel, a security control panel, a TV box (e.g., a Samsung Home-Sync™, an Apple TV™, or a Google TV™), a gaming console (e.g., Xbox™ or PlayStation™), an electronic dictionary, an electronic key, a camcorder or a digital photo frame.

In another embodiment, the electronic device may include at least one of various medical devices (e.g., various portable medical meters (e.g., a blood glucose meter, a heart rate meter, a blood pressure meter, a body temperature meter or the like), a magnetic resonance angiography (MRA) device, a magnetic resonance imaging (MRI) device, a computed tomography (CT) device, a medical camcorder, an ultrasonic device or the like), a navigation device, a global navigation satellite system (GNSS), an event data recorder (EDR), a flight data recorder (FDR), an automotive infotainment device, a marine electronic device (e.g., a marine navigation device, a gyro compass or the like), avionics, a security device, a car head unit, an industrial or household robot, an automatic teller's machine (ATM) for banks, point of sales (POS) for shops, or an Internet of things (IoT) device (e.g., an electric bulb, various sensors, an electricity or gas meter, a sprinkler device, a fire alarm, a thermostat, a streetlamp, a toaster, fitness equipment, a hot water tank, a heater, a boiler or the like).

In some embodiments, the electronic device may include at least one of a part of the furniture or building/structure, an electronic board, an electronic signature receiving device, a projector, or various meters (e.g., meters for water, electricity, gas or radio waves). In one embodiment, the electronic device may be one or a combination of the above-described various devices. An electronic device according to some embodiments may be a flexible electronic device. Further, an electronic device according to an embodiment of the present disclosure will not be limited to the above-described devices, and may include a new electronic device provided by the development of technology.

Now, an electronic device according to one embodiment of the present disclosure will be described with reference to the accompanying drawings. As used herein, the term "user" may refer to a person who uses the electronic device, or a device (e.g., an intelligent electronic device) that uses the electronic device.

FIG. 1 is a diagram illustrating a network environment including an electronic device according to various embodiments of the present disclosure. Referring to FIG. 1, an electronic device 101 within a network environment in various embodiments is disclosed.

The electronic device 101 may include a bus 110, a processor 120, a memory 130, an input/output (I/O) interface 150, a display 160, a communication interface 170 and a sensor module 180. In some embodiments, the electronic device 101 may omit at least one of the components, or may additionally include other components.

The bus 110 may include, for example, a circuit that connects the components 120 to 180 to each other, and transfers the communication (e.g., a control message and/or data) between the components 120 to 180.

The processor 120 may include one or more of a central processing unit (CPU), an application processor (AP) or a communication processor (CP). The processor 120 may, for example, execute a control and/or communication-related operation or data processing for at least one other component of the electronic device 101.

In one embodiment, the processor 120 may switch an operation mode of the electronic device 101 currently in a communication session with another electronic device (i.e. currently on a phone call), to at least one of a receiver mode, a speaker mode or a video mode depending on a sensing value measured by the sensor module 180.

In one embodiment, the receiver mode may be an operation mode in which the ear of the user making a call using the electronic device 101 is located within a first range (e.g., 0~5 cm) from the electronic device 101 or the front of the electronic device 101. For example, if a distance between the side of the face of the user making a call and the front of the electronic device 101 is within the first range, the processor 120 may operate the electronic device 101 in the receiver mode and the call is outputted to a receiver speaker of the electronic device 101.

In one embodiment, the speaker mode may be an operation mode in which the user is not located within the first range (e.g., 0~5 cm) from the front of the electronic device 101 and is not located within a second range (e.g., 0~5 cm) from the rear of the electronic device 101. For example, if a distance between the face of the user making a call and the electronic device 101 is greater than or equal to a predetermined distance (e.g., 5 cm or more) and at least a portion of the user's body is not in contact with the rear of the electronic device 101, the processor 120 may operate the electronic device 101 in the speaker mode and the call is outputted to a speaker of the electronic device 101.

In one embodiment, the video mode may be an operation mode in which the user makes a video call using a camera module mounted on the front of the electronic device 101. In the video mode, at least a portion of the user's body may be in contact with the electronic device 101. For example, while a distance between the face of the user making a call and the electronic device 101 is greater than or equal to a predetermined distance (e.g., 5 cm), if the face of the user is located within a first range (e.g., 20 cm~50 cm) from the front of the electronic device 101 and a hand of the user is in contact with the electronic device 101, the processor 120 may operate the electronic device 101 in the video mode.

In one embodiment, the processor 120 may switch a call mode in the electronic device 101 based on a bio-signal (e.g., a photoplethysmography (PPG) signal or an electrocardiography (ECG) signal) received from the sensor module 180. For example, if a side of the face of the user making a call is in close proximity to the front of the electronic device 101, the processor 120 may maintain the operation mode of the electronic device 101, for example the receiver mode, or switch the operation mode of the electronic device 101 to the receiver mode. If the user making a call is facing the front of the electronic device 101, the processor 120 may maintain the operation mode of the electronic device 101, for example the video mode, or switch the operation mode of the electronic device 101 to the video mode. When performing a call function, the electronic device 101 (e.g., the processor 120) may determine whether a bio-signal (e.g., a PPG signal or an ECG signal) is detected from the sensor module 180. If the bio-signal is not detected, the processor 120 may maintain the operation mode of the electronic device 101, for example the speaker mode, or switch the operation mode of the electronic device 101 to the speaker mode. A bio-signal is not detected for example when the electronic device 101 determines that an inanimate object (e.g., a desk or the like) is in close proximity to the rear of the electronic device 101.

In one embodiment, the processor 120 may determine whether the user is in close proximity to the electronic device 101 using a proximity sensor mounted on the front of the electronic device 101, which is included in the sensor module 180. If it is detected through the proximity sensor that a specific object (e.g., a face of the user) is in close proximity to the electronic device 101, the processor 120 may maintain the receiver mode of the electronic device 101, or switch the operation mode of the electronic device 101 to the receiver mode. If the electronic device 101 is already operating in the receiver mode, the processor 120 may maintain the operation mode of the electronic device 101 at the receiver mode. If the electronic device 101 is operating in the speaker mode, the processor 120 may switch the operation mode of the electronic device 101 to the receiver mode.

In one embodiment, the processor 120 may determine whether the user is in close proximity to the electronic device 101 using a proximity sensor mounted on the rear of the electronic device 101, which is included in the sensor module 180. If a specific object (e.g., a body part of the user) is not detected by the proximity sensor mounted on the front of the electronic device 101 and the object is detected by the proximity sensor mounted on the rear of the electronic device 101, the processor 120 may maintain the speaker or video mode of the electronic device 101, or switch the operation mode of the electronic device 101 to the speaker mode or the video mode. If the specific object detected by the proximity sensor mounted on the rear of the electronic device 101 is, for example, the user of the electronic device 101, the processor 120 may maintain the video mode of the electronic device 101, or switch the operation mode of the electronic device 101 to the video mode. If a specific object detected by the proximity sensor mounted on the rear of the electronic device 101 is an inanimate object (e.g., a desk, a chair or the like), the processor 120 may maintain the speaker mode of the electronic device 101, or switch the operation mode of the electronic device 101 to the speaker mode. To facilitate these features, the proximity sensor mounted on the rear of the electronic device 101 may be implemented to include a biometric sensor such as an PPG sensor or an ECG sensor, and the processor 120 may determine whether the object in close proximity to the rear of the electronic device 101 is a person, using the data obtained from the PPG sensor or the ECG sensor.

In one embodiment, the processor 120 may determine the current state of the electronic device 101 based on data from an acceleration sensor or a gyro sensor in the sensor module 180. If a range of a value measured by the acceleration sensor or the gyro sensor is within a first range or is less than a predetermined reference value, the processor 120 may determine that the electronic device 101 is not moving. In one embodiment, if it is determined based on the measurement value measured by the sensor module 180 that a distance between the user making a call and the front of the electronic device 101 is greater than or equal to a predetermined reference value (e.g., 5 cm or more) and the electronic device 101 is not moving, the processor 120 may switch the electronic device 101 to the speaker mode.

If a range of a value measured by the acceleration sensor or the gyro sensor does not fall within the first range or is greater than or equal to the predetermined reference value, the processor 120 may determine that the electronic device 101 is moving. In one embodiment, if it is determined based on the measurement value measured by the sensor module 180 that a distance between the user making a call and the front of the electronic device 101 is greater than or equal to a predetermined reference value (e.g., 5 cm) and the electronic device 101 is moving, the processor 120 may switch the electronic device 101 to the video mode.

In one embodiment, the processor 120 may determine whether a flip cover is mounted on the electronic device 101, based on data measured by a proximity sensor (or a proximity sensor implemented to include a PPG sensor or an ECG sensor) mounted on the front of the electronic device 101 or a proximity sensor mounted on the rear of the electronic device 101, the proximity sensors being included in the sensor module 180. If it is detected using the proximity sensor mounted on the rear of the electronic device 101 that a flip cover is mounted on the rear of the electronic device 101, the processor 120 may determine whether the electronic device 101 is moving, using the acceleration sensor or the gyro sensor. If the electronic device 101 is moving, the processor 120 may control the electronic device 101 so as to operate in the receiver mode or the video mode. If the electronic device 101 is not moving, the processor 120 may control the electronic device 101 so as to operate in the speaker mode.

In one embodiment, the processor 120 may control an operation of the electronic device 101 depending on illuminance information detected from an illuminance sensor in the sensor module 180. For example, if an illuminance around the electronic device 101, which is measured by the illuminance sensor, is less than a predetermined reference value, the processor 120 may switch the operation mode of the electronic device 101 from the video mode to the receiver mode or the speaker mode.

For example, if an illuminance around the electronic device 101, which is measured through the illuminance sensor, is greater than or equal to the predetermined reference value, the processor 120 may switch the operation mode of the electronic device 101 from the receiver mode or the speaker mode to the video mode. As another example, the processor 120 may also change at least one of the screen brightness, the resolution, the font color or the font size depending on the illuminance around the electronic device 101, which is measured by the illuminance sensor. For example, if the illuminance around the electronic device 101 is greater than or equal to the predetermined reference value, the processor 120 may increase the screen brightness or change the font color.

In another example, if the illuminance around the electronic device 101 is less than the predetermined reference value, the processor 120 may control the electronic device 101 so as to turn on the flash, and if the illuminance around the electronic device 101 is greater than or equal to the predetermined reference value, the processor 120 may control the electronic device 101 so as to turn off the flash. If the illuminance around the electronic device 101 is less than the predetermined reference value, the processor 120 may control the electronic device 101 so as to record the call by executing the recording function, and if the illuminance around the electronic device 101 is greater than or equal to the predetermined reference value, the processor 120 may control the electronic device 101 so as to stop the recording function.

The memory 130 may include a volatile and/or non-volatile memory. The memory 130 may, for example, store a command or data related to at least one other component of the electronic device 101.

In one embodiment, the memory 130 may store at least one of reference values for determining an operation mode of the electronic device 101 during a call. For example, the reference values may include a reference value for determining whether the user (or the face of the user) is in close proximity to the front of the electronic device 101, a reference value for determining whether the user (or at least a portion of the user's body) is in close proximity to the rear of the electronic device 101, or a reference value for determining whether an inanimate object is in close proximity to the rear of the electronic device 101.

In one embodiment, the memory 130 may store software and/or a program 140. The program 140 may include, for example, a kernel 141, a middleware 143, an application programming interface (API) 145, and/or an application program(s) (or 'application') 147. At least some of the kernel 141, the middleware 143 or the API 145 may be referred to as an operating system (OS).

The kernel 141 may, for example, control or manage the system resources (e.g., the bus 110, the processor 120, the memory 130 or the like) that are used to execute the operation or function implemented in other programs (e.g., the middleware 143, the API 145, the application program 147 or the like). Further, the kernel 141 may provide an interface by which the middleware 143, the API 145 or the application program 147 can control or manage the system resources by accessing the individual components of the electronic device 101.

The middleware 143 may, for example, perform an intermediary role so that the API 145 or the application program 147 may exchange data with the kernel 141 by communicating with the kernel 141. Further, the middleware 143 may process one or more work requests received from the application program 147 according to their priority. For example, the middleware 143 may give a priority to use the system resources (e.g., the bus 110, the processor 120, the memory 130 or the like) of the electronic device 101, to at least one of the application programs 147. For example, the middleware 143 may process the one or more work requests according to the priority given to at least one of the application programs 147, thereby performing scheduling or load balancing for the one or more work requests.

The API 145 is, for example, an interface by which the application program 147 controls the function provided in the kernel 141 or the middleware 143, and may include, for example, at least one interface or function (e.g., an instruction) for file control, window control, image processing or character control.

The I/O interface 150 may, for example, serve as an interface that can transfer a command or data received from the user or other external devices to the other components of the electronic device 101. Further, the I/O interface 150 may output a command or data received from the other components of the electronic device 101, to the user or other external devices.

In one embodiment, the I/O interface 150 may receive a user input for switching the operation mode of the electronic device 101 to the receiver mode, the speaker mode or the video mode.

The display 160 may include, for example, a liquid crystal display (LCD) display, a light emitting diode (LED) display, an organic light emitting diode (OLED) display, a microelectromechanical systems (MEMS) display, or an electronic paper display. The display 160 may, for example, display a variety of content (e.g., texts, images, videos, icons, symbols or the like), for the user. The display 160 may include a touch screen, and may receive a touch input, a gesture input, a proximity input or a hovering input made by, for example, an electronic pen or a part of the user's body.

In one embodiment, the display 160 may display the operation mode of the electronic device 101, which is presently being executed. For example, by indicating that the receiver mode, the speaker mode or the video mode is currently being executed, the display 160 may notify the user of the current operation mode of the electronic device 101.

The communication interface 170 may, for example, establish communication between the electronic device 101 and an external device (e.g., a first electronic device 102, a second electronic device 104 or a server 106). For example, the communication interface 170 may communicate with the external device (e.g., the second electronic device 104 or the server 106) by being connected to a network 162 through wireless communication or wired communication.

The wireless communication may include at least one of, for example, long term evolution (LTE), long term evolution-advanced (LTE-A), code division multiple access (CDMA), wideband code division multiple access (WCDMA), universal mobile telecommunications system (UMTS), wireless broadband (WiBro) or global system for mobile communications (GSM), as a cellular communication protocol. Further, the wireless communication may include, for example, short-range communication 164. The short-range communication 164 may include at least one of, for example, wireless fidelity (WiFi), Bluetooth (BT), near field communication (NFC) or global navigation satellite system (GNSS). GNSS may include at least one of, for example, global positioning system (GPS), global navigation satellite system (Glonass), navigation satellite system (Beidou or Galileo), or the European global satellite-based navigation system depending on the use area or the bandwidth. Herein, "GPS" may be interchangeably used with "GNSS". The wired communication may include at least one of, for example, universal serial bus (USB), high definition multimedia interface (HDMI), recommended standard 232 (RS-232) or plain old telephone service (POTS). The network 162 may include a telecommunications network, for example, at least one of the computer network (e.g., a local area network (LAN) or a wide area network (WAN)), the Internet, or the telephone network.

The sensor module 180 may, for example, measure the physical attributes or detect the operating status of the electronic device 101, and convert the measured or detected information into an electrical signal. The sensor module 180 may include a proximity sensor, a PPG sensor, an ECG sensor, an acceleration sensor, a gyro sensor or an illuminance sensor, etc.

In one embodiment, the electronic device 101 may further include a processor configured to control the sensor module 180, independently of or as a part of the processor 120, thereby to control the sensor module 180 while the processor 120 is in the sleep state.

Each of the first and second electronic devices 102 and 104 may be identical or non-identical in type to the electronic device 101. In one embodiment, the server 106 may include a group of one or more servers. In one embodiment, all or some of the operations executed in the electronic device 101 may be executed in one or multiple other electronic devices (e.g., the electronic devices 102 and 104 or the server 106). In one embodiment, in a case where the electronic device 101 should perform a certain function or service automatically or upon request, the electronic device 101 may send a request for at least some of the functions related thereto to other electronic devices (e.g., the electronic devices 102 and 104 or the server 106), instead of or in addition to spontaneously executing the function or service. The other electronic devices (e.g., the electronic devices 102 and 104 or the server 106) may execute the requested function or additional function, and transfer the results to the electronic device 101. The electronic device 101 may process the received results intact or additionally, to provide the requested function or service. To this end, for example, the cloud computing, distributed computing, or client-server computing technology may be used.

Figure 2:
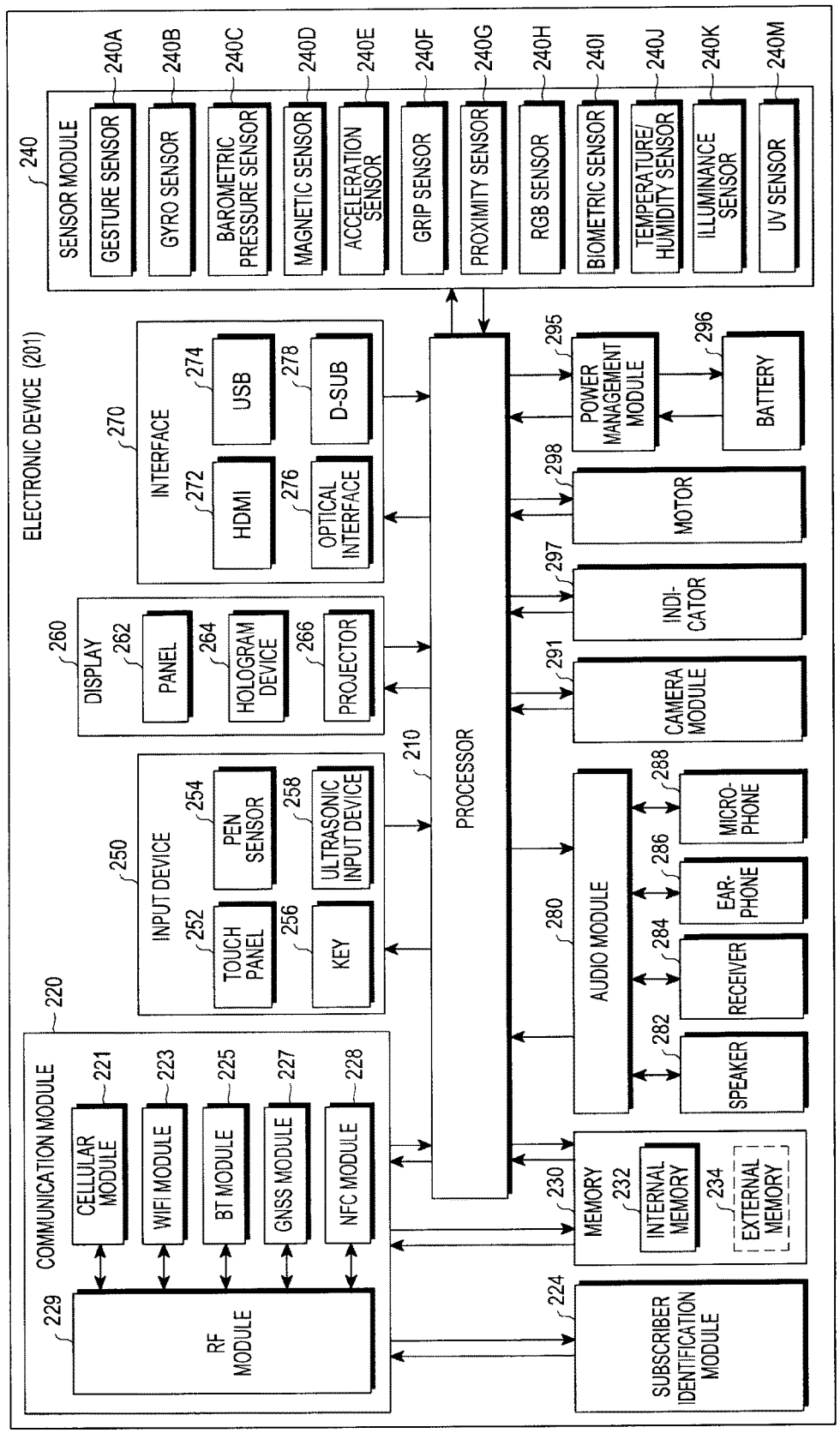
FIG. 2 is a block diagram of an electronic device according to various embodiments of the present disclosure.

FIG. 2 is a block diagram of an electronic device 201 according to various embodiments of the present disclosure.

The electronic device 201 may include, for example, the entirety or a part of the electronic device 101 shown in FIG. 1. The electronic device 201 may include at least one processor (e.g., application processor (AP)) 210, a communication module 220, a subscriber identification module 224, a memory 230, a sensor module 240, an input device 250, a display 260, an interface 270, an audio module 280, a camera module 291, a power management module 295, a battery 296, an indicator 297 and a motor 298.

The processor 210 (e.g., the processor 120) may, for example, control a plurality of hardware or software components connected to the processor 210 by running the operating system or application program, and may process and compute a variety of data. The processor 210 may be implemented in, for example, a system on chip (SoC). In one embodiment, the processor 210 may further include a graphic processing unit (GPU) and/or an image signal processor (ISP). The processor 210 may include at least some (e.g., a cellular module 221) of the components shown in FIG. 2. The processor 210 may load, on a volatile memory, a command or data received from at least one of other components (e.g., a non-volatile memory) and process the loaded data, and may store a variety of data in a non-volatile memory. The control unit or processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The communication module 220 may be identical or similar in structure to the communication interface 170 in FIG. 1. The communication module 220 may include, for example, the cellular module 221, a WiFi module 223, a Bluetooth (BT) module 225, a GNSS module 227 (e.g., a GPS module, a Glonass module, a Beidou module or a Galileo module), an NFC module 228, and a radio frequency (RF) module 229.

The cellular module 221 may, for example, provide a voice call service, a video call service, a messaging service or an Internet service over a communication network. In one embodiment, the cellular module 221 may perform identification and authentication for the electronic device 201 within the communication network using the subscriber identification module (e.g., a SIM card) 224. In one embodiment, the cellular module 221 may perform at least some of the functions that can be provided by the processor 210. In one embodiment, the cellular module 221 may include a communication processor (CP).

Each of the WiFi module 223, the BT module 225, the GNSS module 227 or the NFC module 228 may include, for example, a processor for processing the data transmitted or received through the corresponding module. In some embodiments, at least some (e.g., two or more) of the cellular module 221, WiFi module 223, the BT module 225, the GNSS module 227 or the NFC module 228 may be included in one integrated chip (IC) or IC package.

The RF module 229 may, for example, transmit and receive communication signals (e.g., RF signals). The RF module 229 may include, for example, a transceiver, a power amplifier module (PAM), a frequency filter, a low noise amplifier (LNA), or an antenna. In another embodiment, at least one of the cellular module 221, the WiFi module 223, the BT module 225, the GNSS module 227 or the NFC module 228 may transmit and receive RF signals through its own separate RF module.

The subscriber identification module 224 may include, for example, a card with a subscriber identification module and/or an embedded SIM. The subscriber identification module 224 may include unique identification information (e.g., integrated circuit card identifier (ICCID)) or subscriber information (e.g., international mobile subscriber identity (IMSI)).

The memory 230 (e.g., the memory 130) may include, for example, an internal memory 232 or an external memory 234. The internal memory 232 may include at least one of, for example, a volatile memory (e.g., dynamic RAM (DRAM), static RAM (SRAM), synchronous dynamic RAM (SDRAM) or the like) or a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., a NAND flash, a NOR flash or the like), hard drive, or solid state drive (SSD)).

The external memory 234 may further include a flash drive, for example, compact flash (CF), secure digital (SD), micro secure digital (Micro-SD), mini secure digital (Mini-SD), extreme digital (xD), a multi-media card (MMC), a memory stick or the like. The external memory 234 may be functionally and/or physically connected to the electronic device 201 through various interfaces.

The sensor module 240 (e.g., the sensor module 180) may, for example, measure the physical quantity or detect the operating status of the electronic device 201, and convert the measured or detected information into an electrical signal. The sensor module 240 may include at least one of, for example, a gesture sensor 240A, a gyro sensor 240B, a barometric pressure sensor 240C, a magnetic sensor 240D, an acceleration sensor 240E, a grip sensor 240F, a proximity sensor 240G, a color sensor (e.g., red-green-blue (RGB) sensor) 240H, a biometric sensor 2401, a temperature/humidity sensor 240J, an illuminance sensor 240K, or a ultra violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor and/or a fingerprint sensor. The sensor module 240 may further include a control circuit for controlling at least one or more sensors belonging thereto. In some embodiments, the electronic device 201 may further include a processor configured to control the sensor module 240, independently of or as a part of the processor 210, thereby to control the sensor module 240 while the processor 210 is in a sleep state.

In one embodiment, the gyro sensor 240B or the acceleration sensor 240E may detect the motion of the electronic device 201, and generate motion information indicating the detected motion. The processor 210 may determine based on the motion information whether the electronic device 201 is moving or not.

In one embodiment, the grip sensor 240F may be mounted on the bottom of the electronic device 201 to detect an object (e.g., the user's hand) being in contact with the bottom of the electronic device 201.

In one embodiment, the proximity sensor 240G may be mounted on the front of the electronic device 201, as a front sensor. The proximity sensor 240G may periodically radiate an IR signal (e.g., a near-infrared ray). If the radiated IR signal is reflected by a specific object and returns to the proximity sensor 240G, the proximity sensor 240G may measure the time in which after the IR signal is radiated, the radiated IR signal is reflected by a specific object and returns back to the proximity sensor 240G. If the measured time is less than a predetermined reference time, the proximity sensor 240G may determine that an object is in close proximity to the electronic device 201, thereby detecting the specific object. In another embodiment, the processor 210 may determine that a specific object is in close proximity to the electronic device 201, based on the time measured by the proximity sensor 240G.

In one embodiment, the biometric sensor 2401 configured to include the proximity sensor 240G may be mounted on the rear of the electronic device 201, as a rear sensor. If an object being in close proximity to the rear of the electronic device 201 is a living thing (e.g., the user of the electronic device 201), the biometric sensor 2401 may detect a bio-signal (e.g., a PPG signal or an ECG signal) of the living thing. As a result, the rear sensor may determine whether an object is in close proximity to the rear of the electronic device 201, and whether an object being in close proximity to the rear of the electronic device 201 is a living thing such as the user of the electronic device 201.

The input device 250 may include, for example, a touch panel 252, a (digital) pen sensor 254, a key 256, or an ultrasonic input device 258. The touch panel 252 may, for example, use at least one of the capacitive, resistive, infrared or ultrasonic schemes. The touch panel 252 may further include a control circuit. The touch panel 252 may further include a tactile layer, to provide a tactile or haptic feedback to the user.

The (digital) pen sensor 254, for example, may be a part of the touch panel 252, or may include a separate recognition sheet. The key 256 may include, for example, a physical button, an optical key or a keypad. The ultrasonic input device 258 may detect ultrasonic waves generated in an input tool using a microphone (e.g., a microphone 288), to identify the data corresponding to the detected ultrasonic waves.

The display 260 (e.g., the display 160) may include a panel 262, a hologram device 264, or a projector 266. The panel 262 may be identical or similar in structure to the display 160 in FIG. 1. The panel 262 may, for example, be implemented to be flexible, transparent or wearable. The panel 262, together with the touch panel 252, may be implemented as one module. The hologram device 264 may show stereoscopic images in the air using the interference of the light. The projector 266 may display images by projecting the light onto the screen. The screen may, for example, be disposed on the inside or outside of the electronic device 201. In one embodiment, the display 260 may further include a control circuit for controlling the panel 262, the hologram device 264, or the projector 266.

The interface 270 may include, for example, an HDMI 272, a USB 274, an optical interface 276 or a D-subminiature (D-sub) 278. The interface 270 may, for example, be included in the communication interface 170 shown in FIG. 1. Additionally or alternatively, the interface 270 may include, for example, a mobile high-definition link (MHL) interface, a secure digital (SD) card/multi-media card (MMC) interface or an infrared data association (IrDA) interface.

The audio module 280 may, for example, convert the sounds and the electrical signals bi-directionally. At least some components of the audio module 280 may, for example, be included in the I/O interface 150 shown in FIG. 1. The audio module 280 may, for example, process the sound information that is input or output through a speaker 282, a receiver 284, an earphone 286 or the microphone 288.

In one embodiment, the call sound may be output through the receiver 284 in the receiver mode, and the call sound may be output through the speaker 282 in the speaker mode.

The camera module 291 is, for example, a device capable of capturing still images and videos. In one embodiment, the camera module 291 may include one or more image sensors (e.g., a front image sensor or a rear image sensor), a lens, an image signal processor (ISP), or a flash (e.g., an LED or xenon lamp).

The power management module 295 may, for example, manage the power of the electronic device 201. In one embodiment, the power management module 295 may include, for example, a power management integrated circuit (PMIC), a charger integrated circuit (IC), or a battery or fuel gauge. The PMIC may have the wired and/or wireless charging schemes. The wireless charging scheme may include, for example, a magnetic resonance scheme, a magnetic induction scheme, or an electromagnetic scheme, and the power management module 295 may further include additional circuits (e.g., a coil loop, a resonant circuit, a rectifier or the like) for wireless charging. The battery or fuel gauge may, for example, measure the remaining capacity, charging voltage, charging current or temperature of the battery 296. The battery 296 may include, for example, a rechargeable battery and/or a solar battery.

The indicator 297 may indicate specific status (e.g., boot status, message status, charging status or the like) of the electronic device 201 or a part (e.g. the processor 210) thereof. The motor 298 may convert an electrical signal into mechanical vibrations to generate a vibration or haptic effect. Although not shown, the electronic device 201 may include a processing device (e.g., GPU) for mobile TV support. The processing device for mobile TV support may, for example, process the media data that is based on the standards such as digital multimedia broadcasting (DMB), digital video broadcasting (DVB) or MediaFLO™.

Each of the components described herein may be configured with one or more components, names of which may vary depending on the type of the electronic device. In one embodiment, the electronic device may be configured to include at least one of the components described herein, some of which may be omitted, or may further include additional other components. Further, some of the components of the electronic device according to one embodiment of the present disclosure may be configured as one entity by being combined, thereby performing the functions of the components before their combination, in the same manner.

An electronic device according to an embodiment of the present disclosure may include at least one sensor, and a processor, and the processor may be configured to obtain a bio-signal related to a user of the electronic device using the at least one sensor, and perform a function related to a call based on at least part of the bio-signal.

Figure 3:
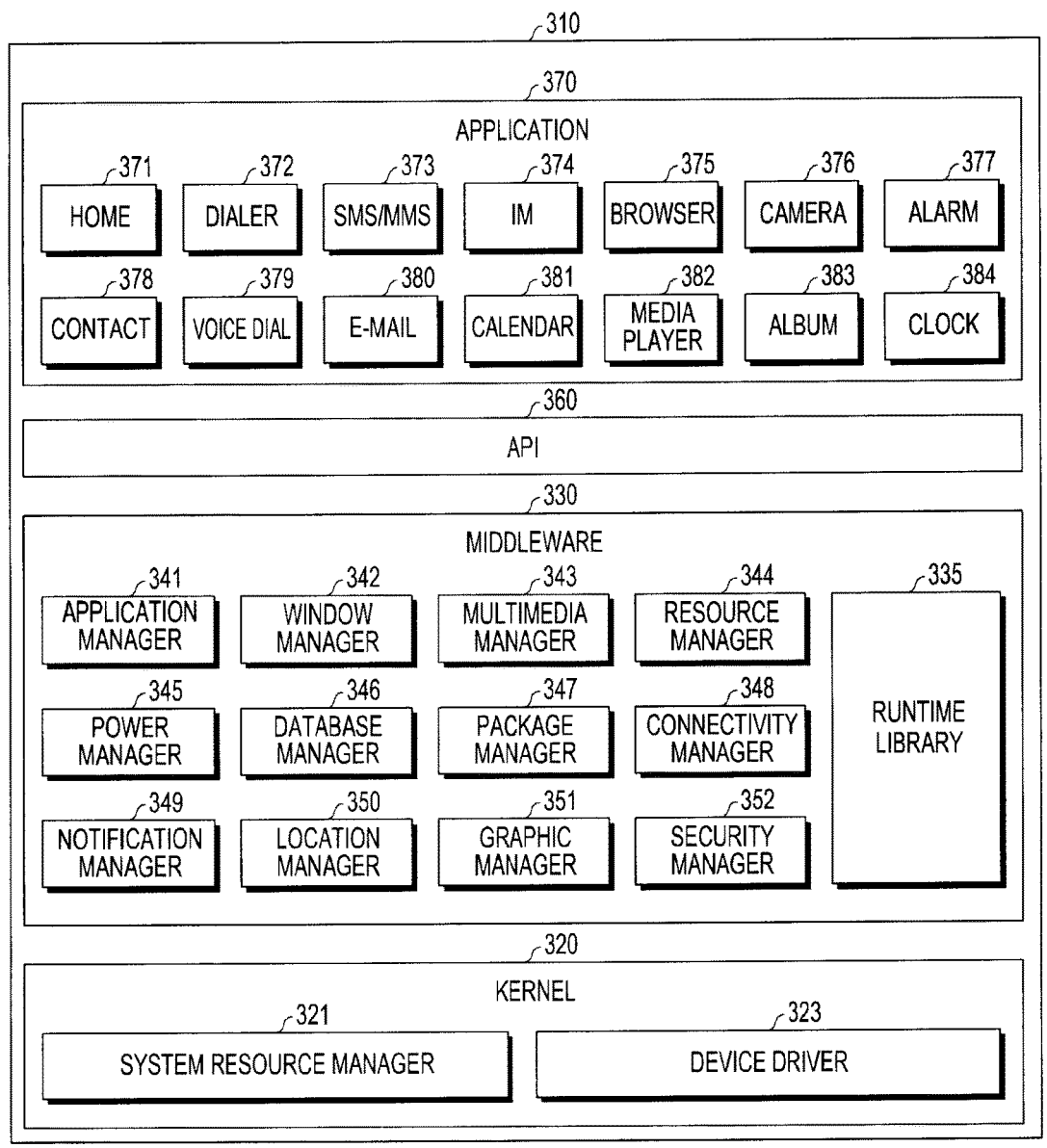
FIG. 3 is a block diagram of a program module according to various embodiments of the present disclosure.

FIG. 3 is a block diagram of a program module according to various embodiments of the present disclosure.

In one embodiment, a program module 310 (e.g., the program 140) may include an operating system (OS) for controlling the resources related to the electronic device (e.g., the electronic device 101), and/or a variety of applications (e.g., the application program 147) that run on the operating system. The operating system may be, for example, Android™, iOS™ Windows™, Symbian™, Tizen™, Bada™ or the like.

The program module 310 may include a kernel 320, a middleware 330, an application programming interface (API) 360, and/or an application(s) 370. At least a part of the program module 310 may be preloaded on the electronic device, or downloaded from the external electronic device (e.g., the electronic devices 102 and 104 and the server 106).

The kernel 320 (e.g., the kernel 141) may include, for example, a system resource manager 321 and/or a device driver 323. The system resource manager 321 may control, allocate or recover the system resources. In one embodiment, the system resource manager 321 may include a process manager, a memory manager, a file system manager or the like. The device driver 323 may include, for example, a display driver, a camera driver, a Bluetooth driver, a shared memory driver, a USB driver, a keypad driver, a WiFi driver, an audio driver, or an inter-process communication (IPC) driver.

The middleware 330, for example, may provide a function that is required in common by the application(s) 370, or may provide various functions to the application 370 through the API 360 so that the application 370 may efficiently use the limited system resources within the electronic device. In one embodiment, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include, for example, a library module that a compiler uses to add a new function through a programming language while the application 370 is run. The runtime library 335 may perform an I/O management function, a memory management function, an arithmetic function or the like.

The application manager 341 may, for example, manage the life cycle of at least one of the application(s) 370. The window manager 342 may manage the graphic user interface (GUI) resources that are used on the screen. The multimedia manager 343 may determine the format required for playback of various media files, and encode or decode the media files using a codec for the format. The resource manager 344 may manage resources such as a source code, a memory or a storage space, for at least one of the application(s) 370.

The power manager 345, for example, may manage the battery or power by operating with the basic input/output system (BIOS), and provide power information required for an operation of the electronic device. The database manager 346 may create, search or update the database that is to be used by at least one of the application(s) 370. The package manager 347 may manage installation or update of applications that are distributed in the form of a package file.

The connectivity manager 348 may, for example, manage wireless connection such as WiFi or Bluetooth. The notification manager 349 may indicate or notify events such as message arrival, appointments and proximity alerts in a manner that doesn't interfere with the user. The location manager 350 may manage the location information of the electronic device. The graphic manager 351 may manage the graphic effect to be provided to the user, or the user interface related thereto. The security manager 352 may provide various security functions required for the system security or user authentication. In one embodiment, if the electronic device (e.g., the electronic device 101) includes a phone function, the middleware 330 may further include a telephony manager for managing the voice or video call function of the electronic device.

The middleware 330 may include a middleware module that forms a combination of various functions of the above-described components. The middleware 330 may provide a module specialized for each type of the operating system in order to provide a differentiated function. Further, the middleware 330 may dynamically remove some of the existing components, or add new components.

The API 360 (e.g., the API 145), for example, is a set of API programming functions, and may be provided in a different configuration depending on the operating system. For example, for Android™ or iOS™, the API 360 may provide one API set per platform, and for Tizen™, the API 360 may provide two or more API sets per platform.

The application 370 (e.g., the application program 147) may include, for example, one or more applications capable of performing such functions as a home 371, a dialer 372, a short message service/multimedia messaging service (SMS/MMS) 373, an instant message (IM) 374, a browser 375, a camera 376, an alarm 377, a contact 378, a voice dial 379, an Email 380, a calendar 381, a media player 382, an album 383, a clock 384, healthcare (e.g., a function for measuring the quantity of exercise, the blood glucose or the like), or environmental information provision (e.g., a function for providing information about the atmospheric pressure, the humidity, the temperature or the like).

In one embodiment, the application 370 may include an application (hereinafter, referred to as an 'information exchange application' for convenience of description) for supporting information exchange between the electronic device (e.g., the electronic device 101) and external electronic devices (e.g., the electronic devices 102 and 104). The information exchange application may include, for example, a notification relay application for delivering specific information to the external electronic devices, or a device management application for managing the external electronic devices.

For example, the notification relay application may include a function of delivering notification information generated in other applications (e.g., an SMS/MMS application, an Email application, a healthcare application, an environmental information application or the like) of the electronic device, to the external electronic devices (e.g., the electronic devices 102 and 104). Further, the notification relay application may, for example, receive notification information from an external electronic device, and provide the received notification information to the user.

The device management application may, for example, manage at least one function (e.g., a function of adjusting the turn-on/off of the external electronic device itself (or some components thereof) or the brightness (or the resolution) of the display) of the external electronic device (e.g., the electronic devices 102 and 104) communicating with the electronic device, and may manage (e.g., install, delete or update) an application operating in the external electronic device or a service (e.g., a call service or a messaging service) provided in the external electronic device.

In one embodiment, the application 370 may include an application (e.g., a healthcare application for a mobile medical device) that is specified depending on the properties (indicating that the type of the electronic device is the mobile medical device) of the external electronic device (e.g., the electronic devices 102 and 104). In one embodiment, the application 370 may include an application received or downloaded from the external electronic device (e.g., the server 106 or the electronic devices 102 and 104). In one embodiment, the application 370 may include a preloaded application or a third party application that can be downloaded from the server. The names of the components of the illustrated program module 310 may vary depending on the type of the operating system.

In one embodiment, at least a part of the program module 310 may be implemented by software, firmware, hardware or a combination thereof. At least a part of the program module 310 may, for example, be implemented (e.g., executed) by a processor (e.g., the processor 210). At least a part of the program module 310 may include, for example, a module, a program, a routine, an instruction set or a process, for performing one or more functions.

Figure 4:
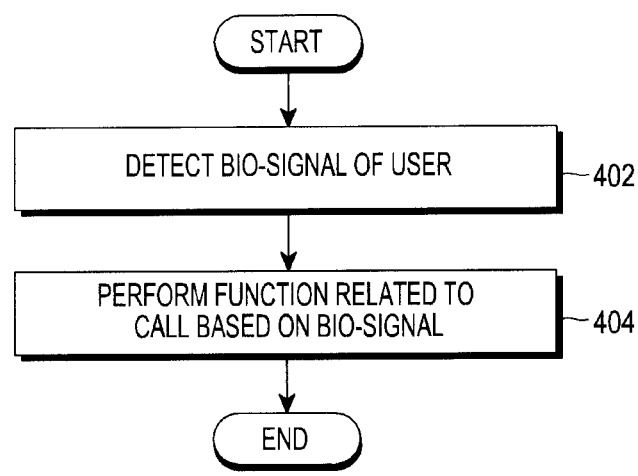
FIG. 4 is a flowchart illustrating an example of an operation method of an electronic device 101 according to one embodiment of the present disclosure.

FIG. 4 is a flowchart illustrating an example of an operation method of an electronic device 101 according to one embodiment of the present disclosure.

Referring to FIG. 4, in operation 402, the electronic device 101 (e.g., the processor 120) may detect a bio-signal (e.g., a PPG signal or an ECG signal) of its user by using the sensor module 180 (e.g., the biometric sensor 2401). In one embodiment, the processor 120 may measure (or determine) a blood flow, an electrocardiogram, a heart rate or the like of the user of the electronic device 101 based on the PPG signal or the ECG signal that is obtained through the sensor module 180 in operation 402.

If the bio-signal is detected, the electronic device 101 (e.g., the processor 120) may perform a function related to a communication session of the electronic device 101 based on the bio-signal in operation 404, for example to switch a mode of the communication session. The mode-switch operation 404 may be at least one of an operation of maintaining the current operation mode of the electronic device 101 during a call, an operation of switching from the receiver mode to the speaker mode or the video mode, an operation of switching from the speaker mode to the receiver mode or the video mode, or an operation of switching from the video mode to the receiver mode or the speaker mode.

In one embodiment, if the bio-signal is detected, the electronic device 101 (e.g., the processor 120) may change the properties related to the sound based on the bio-signal in operation 404. For example, if the bio-signal is detected, the processor 120 may adjust the volume of the communication session or call. For example, if the bio-signal is detected during playback of content, the processor 120 may control the electronic device 101 to output the content at a specified volume.

In one embodiment, the electronic device 101 (e.g., the processor 120) may determine whether the detected bio-signal is a bio-signal in a normal state. For example, the electronic device 101 may determine whether the bio-signal detected by the biometric sensor 2401 falls within a normal range. If the bio-signal does not fall within the normal range, the electronic device 101 may initiate an emergency call. In one embodiment, the electronic device 101 (e.g., the processor 120) may execute functions depending on the detection cycle of the bio-signal. For example, if the bio-signal is detected at a first point during the call, the electronic device 101 may run a recording function. If the bio-signal is detected at a second point during the call, the electronic device 101 may run a note-taking function.

In one embodiment, the electronic device 101 (e.g., the processor 120) may use the detection pattern of the bio-signal as a Morse code. For example, the electronic device 101 may perform character entry by converting the detection pattern of the bio-signal into the Morse code.

Figure 5:
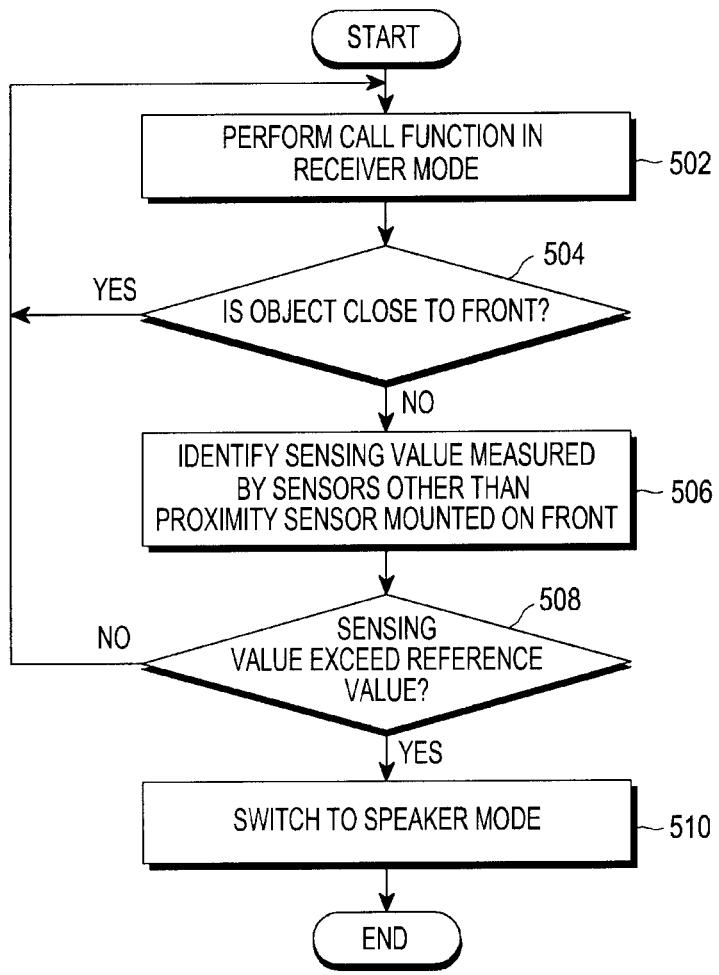
FIG. 5 is a flowchart illustrating another example of an operation method of an electronic device 101 according to one embodiment of the present disclosure.

FIG. 5 is a flowchart illustrating another example of an operation method of an electronic device 101 according to one embodiment of the present disclosure.

Referring to FIG. 5, in operation 502, the electronic device 101 (e.g., the processor 120) may perform a call function in the receiver mode, i.e. initiate the communication session with another electronic device so that the audio of the session is outputted by the receiver speaker of the electronic device 101. In operation 504, the electronic device 101 (e.g., the processor 120) may determine whether an object is in close proximity to the front of the electronic device 101, using the sensor module 180. In one embodiment, in operation 504, the processor 120 may determine whether an object is in close proximity to the front of the electronic device 101, based on a measurement by a sensor (e.g., a proximity sensor implemented to include the PPG sensor or the ECG sensor) mounted on the front of the electronic device 101. In one embodiment, the processor 120 may check whether an object is in close proximity to the front of the electronic device 101, by repeating operation 504 at regular intervals (e.g., every 5 seconds).

If it is determined in operation 504 that an object is in close proximity to the front of the electronic device 101 (YES in 504), the processor 120 may continuously perform the call function in the receiver mode in operation 502. If it is determined in operation 504 that an object is not in close proximity to the front of the electronic device 101 (NO in 504), the processor 120 may determine or identify, in operation 506, sensing value or data measured by at least one of the sensors (e.g., a proximity sensor, a PPG sensor, an ECG sensor, an acceleration sensor, a gyro sensor or an illuminance sensor mounted on the rear of the electronic device 101) other than the proximity sensor mounted on the front of the electronic device 101.

In one embodiment, the electronic device 101 (e.g., the processor 120) may detect a bio-signal (e.g., a PPG signal or an ECG signal) using a biometric sensor (e.g., the biometric sensor 2401) in operation 506.

The electronic device 101 (e.g., the processor 120) may determine in operation 508 whether the sensing value determined in operation 506 exceeds a reference value or threshold value. In operation 508, the electronic device 101 (e.g., the processor 120) may determine whether an object is in close proximity to the rear of the electronic device 101, based on the sensing value determined in operation 506. If an object is in close proximity to the rear of the electronic device 101, the electronic device 101 (e.g., the processor 120) may determine whether a living thing (e.g., the user) is in close proximity to the rear of the electronic device 101 or an inanimate object is in close proximity to the rear of the electronic device 101. For example, if it is detected by the proximity sensor (e.g., the proximity sensor 240G) mounted on the rear of the electronic device 101 that an object is in close proximity to the rear of the electronic device 101, and if a bio-signal is detected by the biometric sensor (e.g., the PPG sensor or the ECG sensor) mounted on the rear of the electronic device 101, the electronic device 101 (e.g., the processor 120) may determine that the bio-signal is a bio-signal by the user of the electronic device 101. In the case where an object is in close proximity to the rear of the electronic device 101, if a bio-signal is not detected by the biometric sensor (e.g., the PPG sensor or the ECG sensor) mounted on the rear of the electronic device 101, the electronic device 101 (e.g., the processor 120) may determine that an inanimate object is in close proximity to the rear of the electronic device 101. In FIG. 5, if the sensing value, e.g. the bio-signal, determined in operation 506 does not exceed a reference value, it is assumed that an inanimate object is in close proximity to the rear of the electronic device 101.

If it is determined in operation 508 that the sensing value does not exceed the reference value (NO in 508), the processor 120 may continuously perform the call function in the receiver mode in operation 502. If it is determined in operation 508 that the sensing value exceeds the reference value (YES in 508), the processor 120 may switch the operation mode of the electronic device 101 to the speaker mode in operation 510. Doing so allows the user at the rear of the electronic device to hear the audio of the communication session.

Figure 6:
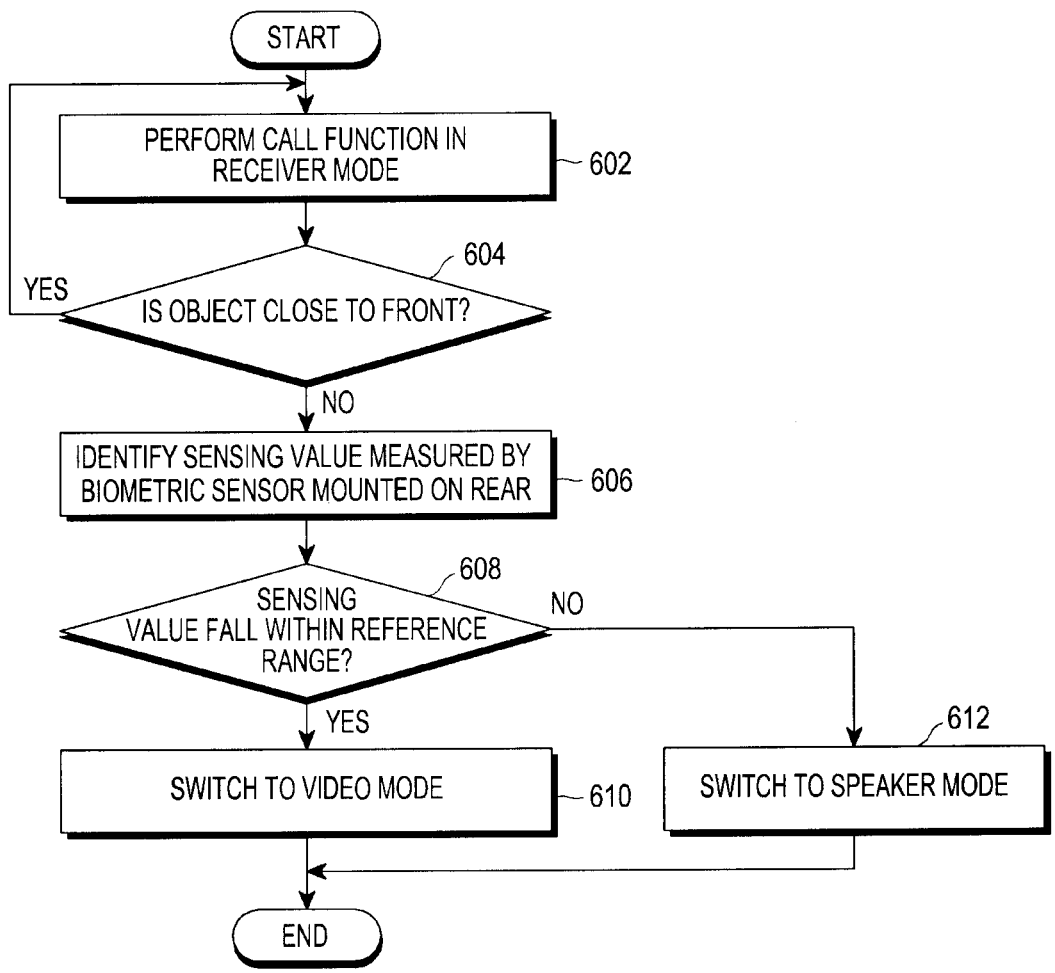
FIG. 6 is a flowchart illustrating an operation method of an electronic device according to one embodiment of the present disclosure.

FIG. 6 is a flowchart illustrating an operation method of an electronic device according to one embodiment of the present disclosure.

Referring to FIG. 6, in operation 602, the electronic device 101 (e.g., the processor 120) may perform the call function in the receiver mode, i.e. initiate the communication session with another electronic device so that the audio of the session is outputted by the receiver speaker of the electronic device 101. In operation 604, the electronic device 101 (e.g., the processor 120) may determine whether an object is in close proximity to the front of the electronic device 101. In one embodiment, in operation 604, the processor 120 may determine whether an object is in close proximity to the front of the electronic device 101 based on measurements from a sensor (e.g., a front proximity sensor) mounted on the front of the electronic device 101. In one embodiment, the processor 120 may check whether an object is in close proximity to the front of the electronic device 101, by repeating operation 604 at regular intervals (e.g., every 5 seconds).

If it is determined in operation 604 that an object is in close proximity to the front of the electronic device 101 (YES in 604), the electronic device 101 (e.g., the processor 120) may continuously perform the call function in the receiver mode in operation 602. If it is determined in operation 604 that an object is not in close proximity to the front of the electronic device 101 (NO in 604), the electronic device 101 (e.g., the processor 120) may determine or identify a sensing value measured by the biometric sensor (e.g., the PPG sensor, the ECG sensor or the like) mounted on the rear of the electronic device 101, in operation 606. In one embodiment, a proximity sensor (e.g., the proximity sensor 240G) may be mounted on the rear of the electronic device 101, and the proximity sensor may be implemented to include the biometric sensor (e.g., the PPG sensor or the ECG sensor). In operation 606, the electronic device 101 (e.g., the processor 120) may identify not only the sensing value or data measured by the biometric sensor but also the sensing value or data measured by the proximity sensor.

In operation 608, the processor 120 may determine whether the sensing value identified in operation 606 falls within a predetermined reference range. The reference range may be one or more reference values for determining whether an object being in close proximity to the rear of the electronic device 101 is the user of the electronic device 101.

For example, the PPG sensor may measure the heart rate of the object being in close proximity to the rear of the electronic device 101. If the heart rate of the object being in close proximity to the rear of the electronic device 101 falls within a predetermined reference range (e.g., 60 to 100), the processor 120 may determine the object as a person (i.e., the user) who is using the electronic device 101. A red LED or an IR LED included in the PPG sensor may radiate an infrared signal. The infrared signal may pass through the blood vessels of the human body and/or may be reflected by the blood vessels. A photo diode of the PPG sensor may detect the infrared signal reflected by the blood vessels of the human body. The PPG sensor or the processor 120 may detect (or determine) the heart rate or the oxygen saturation of the user using the detected infrared signal. For example, if the user is holding the electronic device 101 such that his or her hand is wrapped around the rear of the electronic device 101, the PPG sensor may radiate an infrared signal toward the hand wrapping around the rear of the electronic device 101 to measure the heart rate of the user. The reference range may be a reference value for determining whether the heart rate measured by the PPG sensor is the user's heart rate, and may be set to a range to include the heart rate of the human. In other words, if the user is holding the electronic device 101, the PPG sensor may measure the heart rate of the user.

If the heart rate of the object in close proximity to the rear of the electronic device 101 does not fall within a predetermined reference range (e.g., 60 to 100), the processor 120 may determine the object is not human, or is an inanimate object. For example, if an inanimate object is in close proximity to the rear of the electronic device 101, the heart rate measured through the PPG sensor will be zero (0). Further, if the sensing value (i.e., the heart rate) measured by the PPG sensor is out of the reference range, the object may be not be human, which cannot perform the call function or initiate the communication session using the electronic device 101.

If the sensing value identified in operation 606 falls within a reference range (YES in 608), it may be determined that the object being in close proximity to the rear of the electronic device 101 may be a person, the processor 120 may control the electronic device 101 to automatically switch the operation mode of the electronic device 101 to the video mode. If it is determined in operation 608 that the sensing value falls within the reference range, the electronic device 101 (e.g., the processor 120) may switch the operation mode of the electronic device 101 to the video mode in operation 610.

If the sensing value identified in operation 606 does not fall within the reference range, the object being in close proximity to the rear of the electronic device 101 may be an inanimate object. If it is determined in operation 608 that the sensing value does not fall within the reference range (NO in 608), the electronic device 101 (e.g., the processor 120) may control the electronic device 101 to switch the operation mode of the electronic device 101 to the speaker mode, in operation 612.

Figure 7:
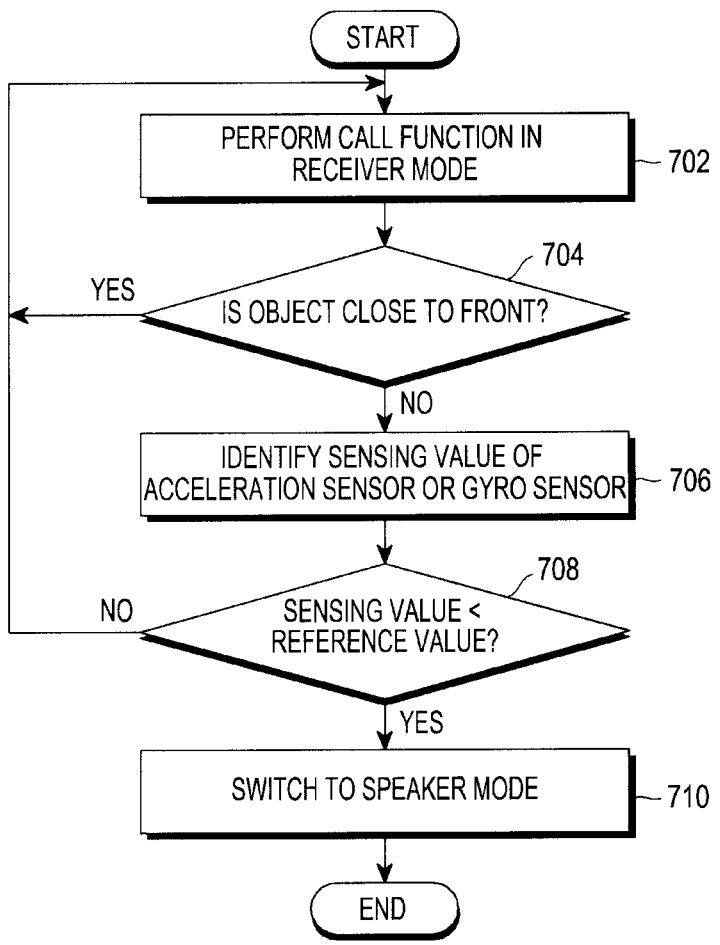
FIG. 7 is a flowchart illustrating an operation method of an electronic device according to one embodiment of the present disclosure.

FIG. 7 is a flowchart illustrating an operation method of an electronic device according to one embodiment of the present disclosure.

Referring to FIG. 7, in operation 702, the electronic device 101 (e.g., the processor 120) may perform a call function in the receiver mode, i.e. initiate the communication session with another electronic device so that the audio of the session is outputted by the receiver speaker of the electronic device 101. In operation 704, the electronic device 101 (e.g., the processor 120) may determine whether an object is in close proximity to the front of the electronic device 101. In one embodiment, in operation 704, the processor 120 may determine whether an object is in close proximity to the front of the electronic device 101, based on a measurement by the sensor mounted on the front of the electronic device 101. In one embodiment, the processor 120 may check whether an object is in close proximity to the front of the electronic device 101, by repeating operation 704 at regular intervals (e.g., every 5 seconds).

If it is determined in operation 704 that an object is in close proximity to the front of the electronic device 101 (YES in 704), the electronic device 101 (e.g., the processor 120) may continuously perform the call function in the receiver mode in operation 702. If it is determined in operation 704 that an object is not in close proximity to the front of the electronic device 101 (NO in 704), the processor 120 may identify a sensing value or data measured by the sensor (e.g., an acceleration sensor or a gyro sensor) other than the front proximity sensor, in operation 706.

In operation 708, the electronic device 101 (e.g., the processor 120) may determine whether the sensing value identified in operation 706 is less than a preset reference value. For example, the acceleration sensor or the gyro sensor may be a sensor for measuring the motion of the electronic device 101. The acceleration sensor or the gyro sensor may measure the motion of the electronic device 101, generate motion information including the measurement result and transfer the generated motion information to the processor 120.

The electronic device 101 (e.g., the processor 120) may determine whether the electronic device 101 is moving, based on the sensing value (i.e., the motion information) identified in operation 706. In FIG. 7, if the sensing value measured by the acceleration sensor or the gyro sensor is greater than or equal to a predetermined reference value, it may be determined that the electronic device 101 is moving.

If it is determined in operation 708 that the sensing value is greater than or equal to a reference value (NO in 708), the electronic device 101 (e.g., the processor 120) may continuously perform the call function in the receiver mode in operation 702. If the sensing value measured by the acceleration sensor or the gyro sensor is greater than or equal to a reference value, indicating that the electronic device 101 is moving, the processor 120 may maintain the receiver mode of the electronic device 101. In another embodiment not shown, if it is determined in operation 708 that the sensing value measured by the acceleration sensor or the gyro sensor is greater than or equal to a reference value, the processor 120 may switch the operation mode of the electronic device 101 to the video mode.

It is determined in operation 708 that the sensing value is less than the reference value (YES in 708), the electronic device 101 (e.g., the processor 120) may switch the operation mode of the electronic device 101 to the speaker mode in operation 710.

Figure 8:
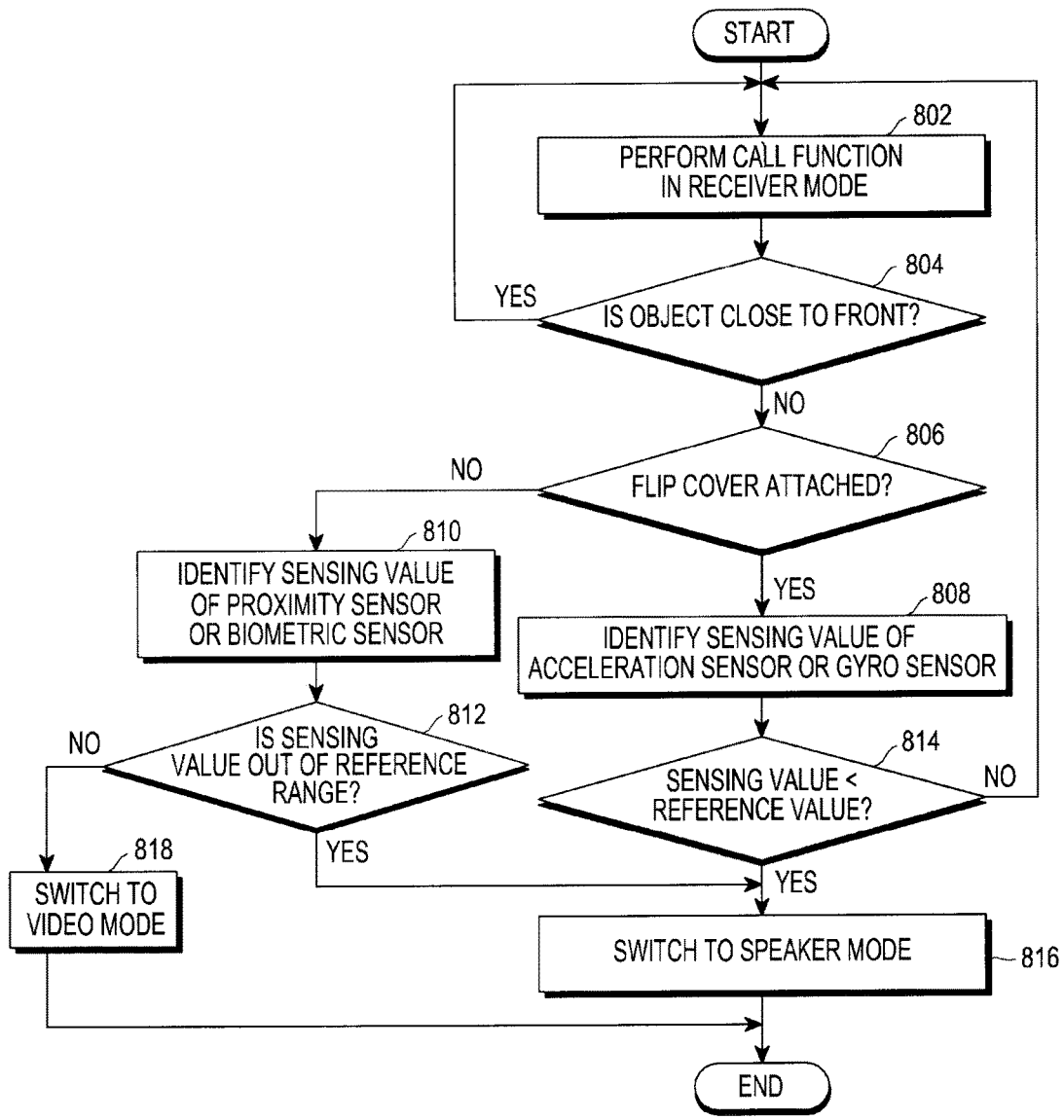
FIG. 8 is a flowchart illustrating an operation method of an electronic device according to one embodiment of the present disclosure.

FIG. 8 is a flowchart illustrating an operation method of an electronic device according to one embodiment of the present disclosure.

Referring to FIG. 8, in operation 802, the electronic device 101 (e.g., the processor 120) may perform a call function in the receiver mode, i.e. initiate the communication session with another electronic device so that the audio of the session is outputted by the receiver speaker of the electronic device 101. In operation 804, the electronic device 101 (e.g., the processor 120) may determine whether an object is in close proximity to the front of the electronic device 101. In one embodiment, in operation 804, the processor 120 may determine whether an object is in close proximity to the front of the electronic device 101, based on measurements by the proximity sensor mounted on the front of the electronic device 101. In one embodiment, the processor 120 may check whether an object is in close proximity to the front of the electronic device 101, by repeating operation 804 at regular intervals (e.g., every 5 seconds).

If it is determined in operation 804 that an object is in close proximity to the front of the electronic device 101 (YES in 804), the processor 120 may control the electronic device 101 to continuously perform the call function in the receiver mode, in operation 802. If it is determined in operation 804 that an object is not in close proximity to the front of the electronic device 101 (NO in 804), the electronic device 101 (e.g., the processor 120) may determine in operation 806 whether a flip cover is attached onto the electronic device 101. In FIG. 8, if the flip cover is attached onto the electronic device 101, an electrical signal indicating the attachment of the flip cover may be transferred to the processor 120 of the electronic device 101. In operation 806, the electronic device 101 (e.g., the processor 120) may determine whether a flip cover is attached onto the electronic device 101 by determining whether it has received the electrical signal.

If it is determined in operation 806 that the flip cover is not attached (NO in 806), the electronic device 101 (e.g., the processor 120) may identify, in operation 810, a sensing value measured by the sensor (e.g., a proximity sensor (e.g., the proximity sensor 240G) or a biometric sensor (e.g., a PPG sensor or an ECG sensor)) mounted on the rear of the electronic device 101. In operation 812, the processor 120 may determine whether the sensing value is out of a reference range. The reference range may be one or more values for determining whether the object detected through the proximity sensor or the biometric sensor is a user of the electronic device 101.

If it is determined in operation 812 that the sensing value is not out of the reference range (NO in 812), the electronic device 101 (e.g., the processor 120) may switch the operation mode of the electronic device 101 to the video mode in operation 818. If it is determined in operation 812 that the sensing value is out of the reference range (YES in 812), the processor 120 may control the electronic device 101 to switch its operation mode to the speaker mode in operation 816.

If it is determine in operation 806 that a flip cover is attached (YES in 806), the electronic device 101 (e.g., the processor 120) may identify a sensing value of the acceleration sensor or the gyro sensor in operation 808. The processor 120 may determine in operation 814 whether the sensing value is less than a reference value. The reference value may be a reference value for determining whether the electronic device 101 is moving.

If it is determined in operation 814 that the sensing value is greater than or equal to a reference value (NO in 814), the processor 120 may control the electronic device 101 to perform the call function in the receiver mode in operation 802. In another embodiment not shown, the processor 120 may control the electronic device 101 to switch its operation mode to the video mode. If it is determined in operation 814 that the sensing value is less than the reference value (YES in 814), the processor 120 may control the electronic device 101 to switch its operation mode to the speaker mode in operation 816.

Figure 9:
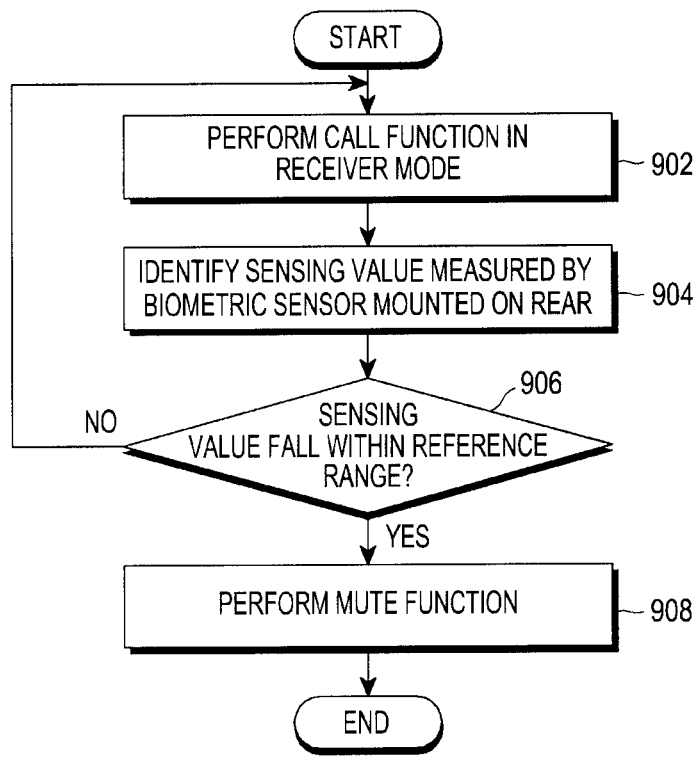
FIG. 9 is a flowchart illustrating an operation method of an electronic device according to one embodiment of the present disclosure.

FIG. 9 is a flowchart illustrating an operation method of an electronic device according to one embodiment of the present disclosure.

Referring to FIG. 9, in operation 902, the electronic device 101 (e.g., the processor 120) may perform a call function in the receiver mode, i.e. initiate the communication session with another electronic device so that the audio of the session is outputted by the receiver speaker of the electronic device 101. In operation 904, the electronic device 101 (e.g., the processor 120) may identify a sensing value measured by the biometric sensor mounted on the rear of the electronic device 101.

In operation 906, the electronic device 101 (e.g., the processor 120) may determine whether the sensing value falls within a reference range. The reference range may be one or more values for determining whether the sensing value measured by the biometric sensor corresponds to the user's bio-signal (e.g., the blood pressure, the heart rate or the like). In one embodiment, if the sensing value is detected in operation 904, the electronic device 101 (e.g., the processor 120) may perform operation 908 after operation 904, omitting operation 906. For example, upon detecting a bio-signal, the electronic device 101 may run a mute function without the operation of analyzing (or determining) the bio-signal.

If it is determined in operation 906 that the sensing value does not fall within the reference range (NO in 906), the electronic device 101 (e.g., the processor 120) may continuously perform the call function in the receiver mode in operation 902. If it is determined in operation 906 that the sensing value falls within the reference range (YES in 906), the electronic device 101 (e.g., the processor 120) may control the electronic device 101 to run the mute function in operation 908. In other words, by being detected by the biometric sensor mounted on the rear of the electronic device 101 using his/her finger, the user making a call using the electronic device 101 may easily perform the mute function.

In one embodiment, the electronic device 101 (e.g., the processor 120) may check whether the user's bio-signal is detected at the rear of the electronic device 101, by repeating operations 904 and 906 at regular intervals (e.g., every 5 seconds).

Figure 10:
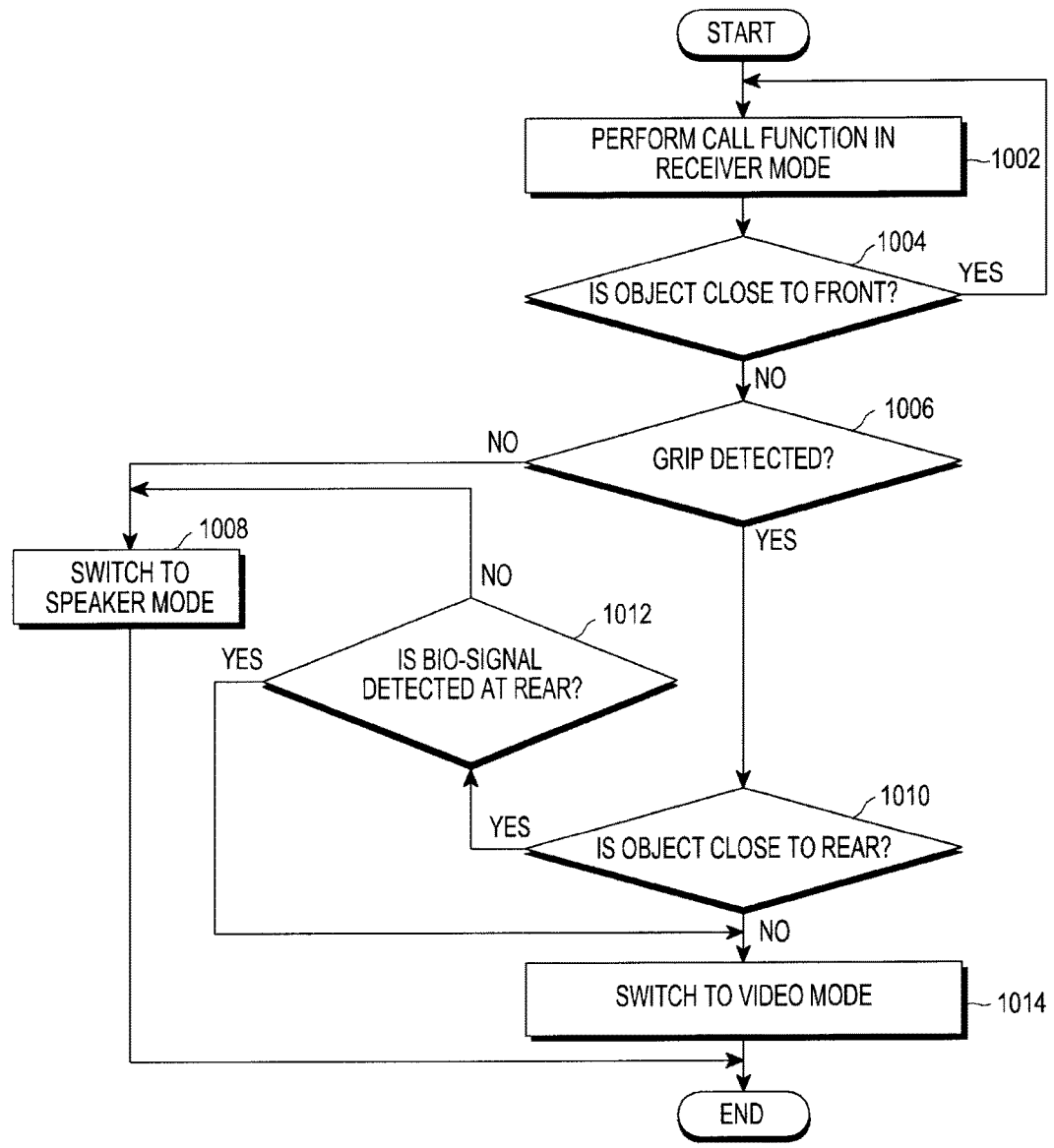
FIG. 10 is a flowchart illustrating an operation method of an electronic device according to one embodiment of the present disclosure.

FIG. 10 is a flowchart illustrating an operation method of an electronic device according to one embodiment of the present disclosure.

Referring to FIG. 10, in operation 1002, the electronic device 101 (e.g., the processor 120) may perform a call function in the receiver mode, i.e. initiate the communication session with another electronic device so that the audio of the session is outputted by the receiver speaker of the electronic device 101. In operation 1004, the electronic device 101 (e.g., the processor 120) may determine whether an object is in close proximity to the front of the electronic device 101. In one embodiment, the electronic device 101 (e.g., the processor 120) may determine in operation 1004 whether an object is in close proximity to the front of the electronic device 101, based on a measurement by the proximity sensor mounted on the front of the electronic device 101. In one embodiment, the electronic device 101 (e.g., the processor 120) may check whether an object is in close proximity to the front of the electronic device 101, by repeating operation 1004 at regular intervals (e.g., every 5 seconds).

If it is determined in operation 1004 that an object is in close proximity to the front of the electronic device 101 (YES in 1004), the electronic device 101 (e.g., the processor 120) may control the electronic device 101 to continuously perform the call function in the receiver mode in operation 1002. If it is determined in operation 1004 that an object is not in close proximity to the front of the electronic device 101 (NO in 1004), the electronic device 101 (e.g., the processor 120) may determine in operation 1006 whether a grip is detected on the electronic device 101. In one embodiment, a grip sensor (e.g., the grip sensor 240F) may be mounted on the electronic device 101, and the grip sensor may detect the grip on the electronic device 101. For example, if the user grabs the bottom of the electronic device 101 with his or her hand, the grip may occur, and the grip sensor may detect the grip.

If it is determined in operation 1006 that a grip is not detected (NO in 1006), the electronic device 101 (e.g., the processor 120) may control the electronic device 101 to switch its operation mode to the speaker mode in operation 1008. If it is determined in operation 1006 that a grip is detected (YES in 1006), the electronic device 101 (e.g., the processor 120) may determine in operation 1010 whether an object is in close proximity to the rear of the electronic device 101. The electronic device 101 (e.g., the processor 120) may determine whether an object is in close proximity to the rear of the electronic device 101, based on a sensing value or data measured by the proximity sensor mounted on the rear of the electronic device 101.

If it is determined in operation 1010 that an object is not in close proximity to the rear of the electronic device 101 (NO in 1010), the electronic device 101 (e.g., the processor 120) may control the electronic device 101 to switch its operation mode to the video mode in operation 1014. Or, if it is determined in operation 1010 that an object is not in close proximity to the rear of the electronic device 101 (NO in 1010), the electronic device 101 (e.g., the processor 120) may control the electronic device 101 to continuously perform the call function in the receiver mode in operation 1002. If it is determined in operation 1010 that an object is in close proximity to the rear of the electronic device 101 (YES in 1010), the electronic device 101 (e.g., the processor 120) may determine in operation 1012 whether a bio-signal is detected at the rear of the electronic device 101. In one embodiment, the proximity sensor mounted on the rear of the electronic device 101 may be implemented to include a biometric sensor (e.g., a PPG sensor, an ECG or the like). The electronic device 101 (e.g., the processor 120) may identify a sensing value measured by the biometric sensor to determine whether the object being in close proximity to the rear of the electronic device 101 is the user of the electronic device 101.

If it is determined in operation 1012 that a bio-signal is detected at the rear of the electronic device 101 (YES in 1012), the electronic device 101 (e.g., the processor 120) may control the electronic device 101 to switch its operation mode to the video mode in operation 1014. If it is determined in operation 1012 that a bio-signal is not detected at the rear of the electronic device 101 (NO in 1012), the electronic device 101 (e.g., the processor 120) may control the electronic device 101 to switch its operation mode to the speaker mode in operation 1008.

A method by an electronic device for switching a mode or controlling a volume of a communication session with another electronic device may include detecting a bio-signal related to a user of the electronic device from at least one biometric sensor of the electronic device, and switching the mode or controlling the volume of the communication session based on at least part of the bio-signal.

Figure 11A:
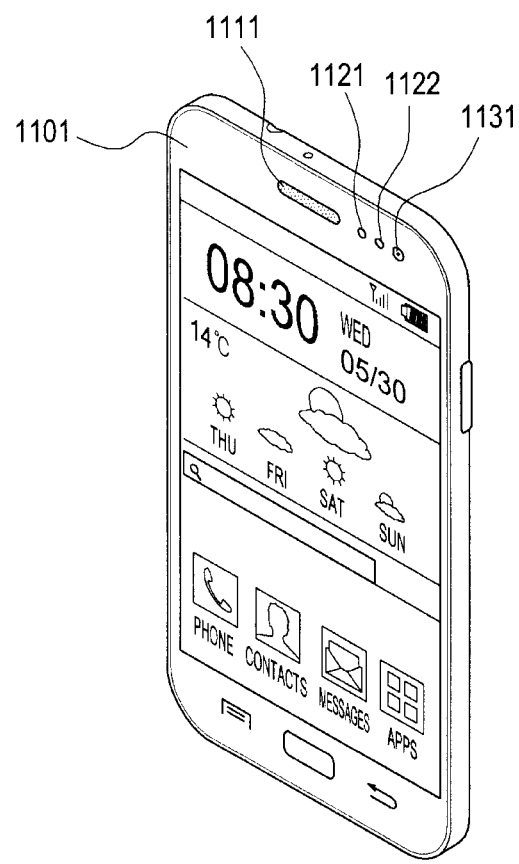
FIG. 11A and FIG. 11B are diagrams illustrating an example of an electronic device according to one embodiment of the present disclosure.
Figure 11B:
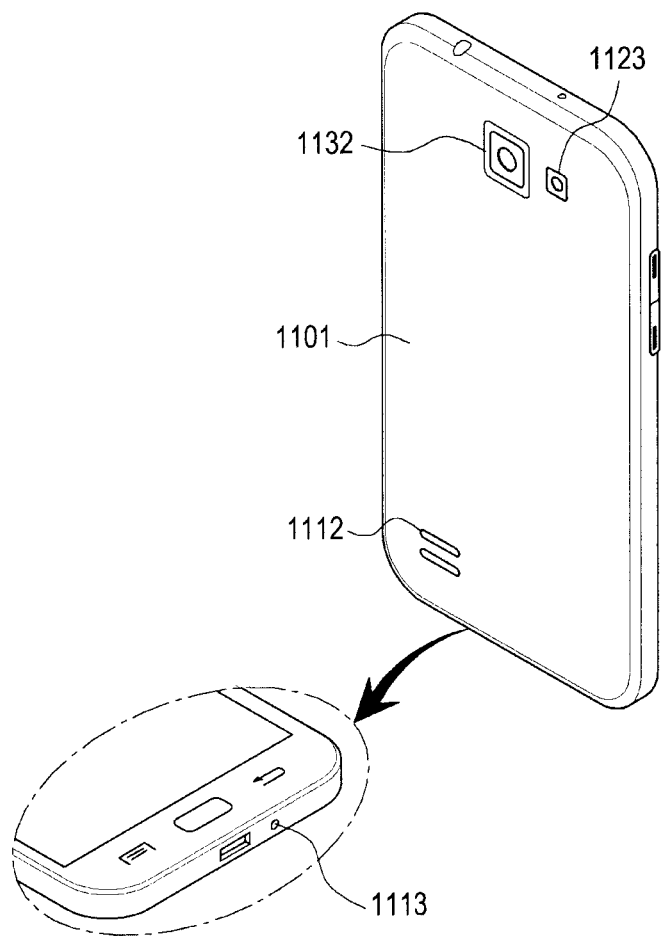

FIGS. 11A and 11B are diagrams illustrating an example of an electronic device according to one embodiment of the present disclosure. Specifically, FIG. 11A is a diagram illustrating the front of an electronic device 1101, and FIG. 11B is a diagram illustrating the rear and bottom of the electronic device 1101.

Referring to FIG. 11A, at least one of a receiver speaker 1111, a proximity sensor 1121, an illuminance sensor 1122 and a first camera 1131 may be mounted (or disposed) on the top front of the electronic device 1101. In one embodiment, the illuminance sensor 1122 may be mounted on the rear or back of the display (e.g., the display 160). In one embodiment, the proximity sensor 1121 may detect that an object (e.g., the user of the electronic device 1101) is in close proximity to the front of the electronic device 1101, and the illuminance sensor 1122 may detect the external brightness of the environment around the electronic device 1101. If the electronic device 1101 is in video mode, the first camera 1131 may shoot a scene in front of the electronic device 1101. If the electronic device 1101 is in the receiver mode, the receiver speaker 1111 may output the sounds generated during a call.

Referring to FIG. 11B, at least one of a second camera 1132, a PPG/ECG sensor 1123 implemented to include a proximity sensor, and a speaker 1112 may be mounted (or disposed) on the rear of the electronic device 1101. In one embodiment, the proximity sensor 1123 may detect that an object (e.g., the user of the electronic device 1101 or an object other than the user such as an inanimate object) is in close proximity to the rear of the electronic device 1101. If the electronic device 1101 is in the speaker mode, the speaker 1112 may output the sounds generated during a call.

Referring to FIG. 11B, a microphone 1113 may be mounted on the bottom of the electronic device 1101. When the electronic device 1101 is performing a call function, the microphone 1113 may receive audio input, e.g. voice from the user.

Figures 12A, 12B:
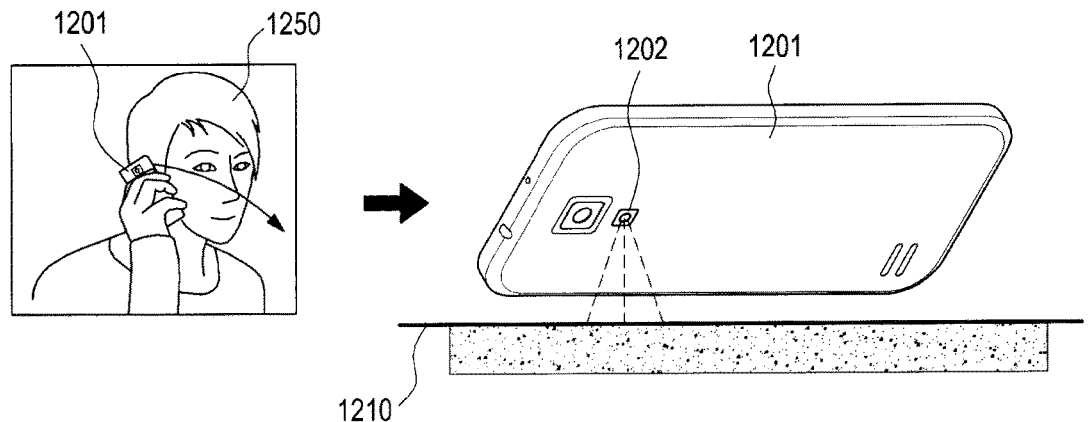
FIG. 12A and FIG. 12B are diagrams illustrating an example in which an operation mode of an electronic device is switched, according to one embodiment of the present disclosure.

FIGS. 12A and 12B are diagrams illustrating an example in which an operation mode of an electronic device is switched, according to one embodiment of the present disclosure.

Specifically, FIG. 12A is a diagram illustrating a case in which a user 1250 is in a communication session using an electronic device 1201 in the receiver mode, and FIG. 12B is a diagram illustrating a case in which if the electronic device 1201 is put down on the floor (or desk) 1210, the operation mode of the electronic device 1201 is switched to the speaker mode.

In FIG. 12A, the face of the user 1250 is in close proximity to the front of the electronic device 1201. A proximity sensor (e.g., the sensor module 180) mounted on the front of the electronic device 1201 may detect the user 1250. Further, a processor (e.g., the processor 120) of the electronic device 1201 may control the electronic device 1201 to operate in the receiver mode based on the detection result, since the user 1250 is in close proximity to the front of the electronic device 1201.

If the user 1250 puts the electronic device 1201 down on the desk 1210 while in a communication session in the receiver mode, the user 1250 may no longer be detected by the proximity sensor mounted on the front of the electronic device 1201. Further, the desk 1210 may be detected by a proximity sensor 1202 (e.g., the sensor module 180) mounted on the rear of the electronic device 1201. The proximity sensor 1202 mounted on the rear of the electronic device 1201 may be implemented to include a PPG sensor or an ECG sensor. The PPG sensor or the ECG sensor may be used to determine that an object detected by the proximity sensor mounted on the rear of the electronic device 1201 is an inanimate object. Since the desk 1210 corresponds to an inanimate object, the processor of the electronic device 1201 may control the electronic device 1201 to operate in the speaker mode.

Figures 13A, 13B, 13C:
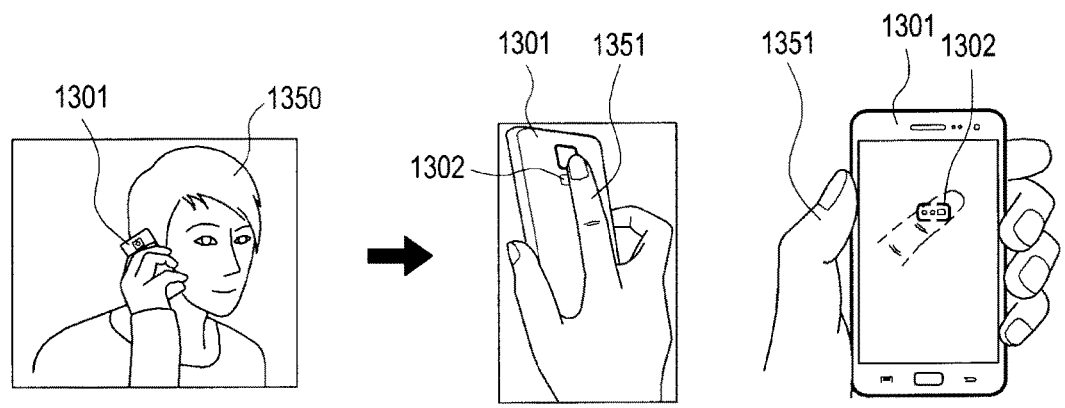
FIG. 13A, FIG. 13B and FIG. 13C are diagrams illustrating another example in which an operation mode of an electronic device is switched, according to one embodiment of the present disclosure.

FIGS. 13A to 13C are diagrams illustrating another example in which an operation mode of an electronic device is switched, according to one embodiment of the present disclosure.

Specifically, FIG. 13A is a diagram illustrating a case in which a user 1350 is in a communication session using an electronic device 1301 in the receiver mode, and FIGS. 13B and 13C are diagrams illustrating a case in which a hand of the user is in close proximity to a proximity sensor mounted on the rear of the electronic device 1301.

In FIG. 13A, the face of the user 1350 is in close proximity to the front of the electronic device 1301. A proximity sensor (e.g., the sensor module 180) mounted on the front of the electronic device 1301 may detect the user 1350. Further, a processor (e.g., the processor 120) of the electronic device 1301 may control the electronic device 1301 to operate in the receiver mode based on the detection result, since the user 1350 is in close proximity to the front of the electronic device 1301.

If the user 1350 makes a contact with a proximity sensor 1302 mounted on the rear of the electronic device 1301 with his/her hand during the call in the receiver mode, the processor may control the electronic device 1301 to run a mute function, muting the input of the call. FIGS. 13B and 13C are diagrams illustrating a case in which the user 1350 makes a contact with the proximity sensor 1302 with his/her hand 1351 in order to run the mute function.

In one embodiment, the mute function may be executed only while the hand 1351 of the user 1350 is in contact with the proximity sensor 1302. If the hand 1351 of the user 1350 is released from the proximity sensor 1302, the processor (e.g., the processor 120) of the electronic device 1301 may control the electronic device 1301 to stop the mute function. Alternatively, the proximity sensor 1302 may be implemented with a biometric sensor so that the bio-signal detected from the user's finger may be used to run the mute function.

Figures 14A, 14B:
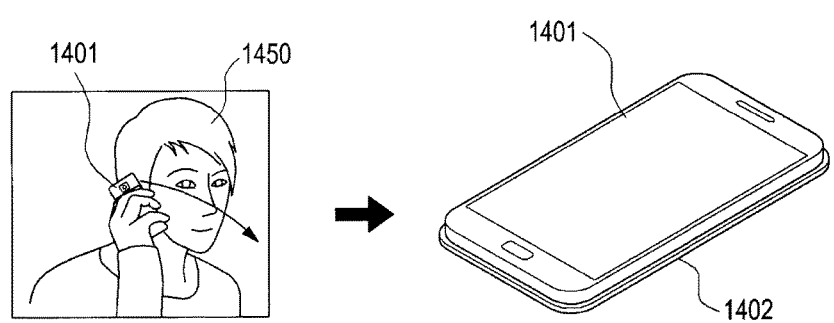
FIG. 14A and FIG. 14B are diagrams illustrating further another example in which an operation mode of an electronic device is switched, according to one embodiment of the present disclosure.

FIGS. 14A and 14B are diagrams illustrating further another example in which an operation mode of an electronic device is switched, according to one embodiment of the present disclosure.

Specifically, FIG. 14A is a diagram illustrating a user who is in a communication session, e.g. taking a call from another user using an electronic device 1401 operating in the receiver mode, and FIG. 14B is a diagram illustrating the electronic device 1401, an operation mode of which is switched to the speaker mode.

In FIG. 14A, the face of the user 1450 is in close proximity to the front of the electronic device 1401. A proximity sensor (e.g., the sensor module 180) mounted on the front of the electronic device 1401 may detect the user 1450. Further, a processor (e.g., the processor 120) of the electronic device 1401 may control the electronic device 1401 to operate in the receiver mode based on the detection result, since the user 1450 is in close proximity to the front of the electronic device 1401.

FIG. 14B is a diagram illustrating a case in which like in FIG. 12B, the electronic device 1401 cannot detect the user 1450. As shown in FIG. 14B, if the user 1450 puts the electronic device 1401 down on a desk during the call in the receiver mode, the user 1450 may not be detected by the proximity sensor mounted on the front of the electronic device 1401.

A flip cover 1402 may be mounted on the rear of the electronic device 1401 shown in FIG. 14B. If the flip cover 1402 is mounted, the proximity sensor (e.g., the sensor module 180) mounted on the rear of the electronic device 1401 may detect the flip cover 1402 when the flip cover is folder under the electronic device 1401. The processor (e.g., the processor 120) of the electronic device 1401 may determine whether an object being in close proximity to the front or rear of the electronic device 1401 is the flip cover 1402 or another object, based on a sensing value measured by the proximity sensor mounted on the front or rear of the electronic device 1401. In FIG. 14B, the processor may detect that the flip cover 1402 is in close proximity to the rear of the electronic device 1401, through the proximity sensor mounted on the rear of the electronic device 1401.

As shown in FIG. 14B, if it is detected that the flip cover 1402 is in close proximity to the rear of the electronic device 1401, the processor of the electronic device 1401 may determine whether the electronic device 1401 is moving, depending on a sensing value detected through an acceleration sensor (e.g., the sensor module 180) or a gyro sensor (e.g., the sensor module 180). If the electronic device 1401 is not moving, the processor may control the electronic device 1401 to operate in the speaker mode.

The term 'module' as used herein may refer to a unit that includes, for example, one or a combination of hardware, software or firmware. The term 'module' may be interchangeably used with terms such as, for example, unit, logic, logical block, component, or circuit. The 'module' may be the minimum unit of an integrally constructed part, or a part thereof. The 'module' may be the minimum unit for performing one or more functions, or a part thereof. The 'module' may be implemented mechanically or electronically. For example, the 'module' may include at least one of an application-specific integrated circuit (ASIC) chip, field-programmable gate arrays (FPGAs), or a programmable-logic device, which are known or will be developed in the future, and which perform certain operations.

At least a part of the apparatus (e.g., modules or functions thereof) or method (e.g., operations) according to various embodiments of the present disclosure may, for example, be implemented by an instruction that is stored in computer-readable storage media in the form of a program module. If the instruction is executed by at least one processor (e.g., the processor 120), the at least one processor may perform a function corresponding to the instruction. The computer-readable storage media may be, for example, the memory 130.

The computer-readable storage media may include magnetic media (e.g., a hard disk, a floppy disk, and magnetic tape), optical media (e.g., a compact disc read only memory (CD-ROM) and a digital versatile disc (DVD)), magneto-optical media (e.g., a floptical disk), and a hardware device (e.g., a read only memory (ROM), a random access memory (RAM) or a flash memory). Further, a program instruction may include not only a machine code such as a code made by a compiler, but also a high-level language code that can be executed by the computer using an interpreter. The above-described hardware device may be configured to operate as one or more software modules to perform the operations according to various embodiments of the present disclosure, and vice versa.

A module or a program module according to various embodiments of the present disclosure may include at least one of the above-described components, some of which may be omitted, or may further include additional other components. Operations performed by a module, a program module or other components according to various embodiments of the present disclosure may be performed in a sequential, parallel, iterative or heuristic way. Some operations may be performed in a different order or omitted, or other operations may be added. Embodiments disclosed herein have been presented for description and understanding of the technical details, but it is not intended to limit the scope of the present disclosure. Therefore, the scope of the present disclosure should be construed to include all changes or various other embodiments based on the technical spirit of the present disclosure.

As is apparent from the foregoing description, according to various embodiments of the present disclosure, an automatic switching function related to a call or communication session may be provided using a sensor included in an electronic device, so automatic switching related to a call may be performed even though the user does not manually change the call mode.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. Any of the functions and steps provided in the Figures may be implemented in hardware, or a combination hardware configured with machine executable code and may be performed in whole or in part within the programmed instructions of a computer. No claim element herein is to be construed under the provisions of 35 U.S.C. 112, sixth paragraph, unless the element is expressly recited using the phrase "means for."

What is claimed is:

1. A method by an electronic device, comprising:
   during a phone call in progress between the electronic device and another electronic device, sensing a signal using at least one biometric sensor of the electronic device;
   determining whether a bio-signal is detected from the sensed signal; and
   controlling an operation mode related to the phone call of the electronic device by changing a property of at least one of a speaker or a display screen of the electronic device, based at least in part on the determination of whether the bio-signal being detected.

2. The method of claim 1, wherein the bio-signal comprises a photoplethysmography (PPG) signal and/or an electrocardiography (ECG) signal.

3. The method of claim 2, wherein controlling the operation mode comprises:
   when the bio-signal is detected, performing a first mode, and
   when the bio-signal is not detected, performing a second mode.

4. The method of claim 3, wherein the first mode is one of a speaker mode, a video mode, a receiver mode, a mute mode, a recording mode, or a note-taking mode, and the second mode is another one of the speaker mode, the video mode, the receiver mode, the mute mode, the recording mode, or the note-taking mode.

5. The method of claim 1, wherein determining whether the bio-signal is detected from the sensed signal comprises:
   detecting proximity information of an object in relation to the electronic device using a proximity sensor of the electronic device;
   determining whether the detected proximity information satisfies a predetermined condition; and detecting the bio-signal using the at least one biometric sensor in response to the detected proximity information satisfying the predetermined condition.

6. The method of claim 1, further comprising:
detecting external illuminance information surrounding the electronic device from an illuminance sensor of the electronic device; and
changing a setting of the display screen during the call to a first setting value based on the detected illuminance information.

7. The method of claim 6, wherein the setting of the display screen includes screen brightness, resolution, font type, font color, or font size.

8. A method of claim 1, further comprising:
detecting external illuminance information surrounding the electronic device using an illuminance sensor of the electronic device;
determining whether the detected illuminance information falls within a first range or a second range; and
when the illuminance information falls within the first range, switching the operation mode during the call to a first mode,
when the illuminance information falls within the second range, switching the operation mode during the call to a second mode.

9. The method of claim 8, wherein switching to the first mode is switching from a video mode to a voice mode based on the illuminance information, and switching to the second mode is switching from the voice mode to the video mode based on the illuminance information.

10. The method of claim 1, further comprising:
determining whether the bio-signal is in a normal range; and
automatically initiating an emergency call if the bio-signal is not in the normal range.

11. An electronic device, comprising:
at least one biometric sensor; and
a processor configured to:
during a phone call in progress between the electronic device and another electronic device, sense a signal using the at least one biometric sensor,
determine whether a bio-signal is detected from the sensed signal, and
control an operation mode related to the phone call of the electronic device by changing a setting of at least one of a speaker or a display screen of the electronic device, based at least in part on the determination of whether the bio-signal being detected.

12. The electronic device of claim 11, wherein the bio-signal comprises a photoplethysmography (PPG) signal and/or an electrocardiography (ECG) signal.

13. The electronic device of claim 12, wherein the processor is configured to:
performing a first mode, when the bio-signal is detected, and
performing a second mode, when the bio-signal is not detected.

14. The electronic device of claim 13, wherein the first mode is one of a speaker mode, a video mode, a receiver mode, a mute mode, a recording mode, or a note-taking mode, and the second mode is another one of the speaker mode, the video mode, the receiver mode, or the mute mode, the recording mode, or the note-taking mode.

15. The electronic device of claim 11, further comprising a proximity sensor;
wherein the processor is further configured to:

detect proximity information of an object in relation to the electronic device using the proximity sensor,
determine whether the detected proximity information satisfies a predetermined condition, and
detect the bio-signal using the at least one biometric sensor in response to the detected proximity information satisfying the predetermined condition.

16. The electronic device of claim 11, further comprising a proximity sensor;
wherein the processor is further configured to:
detect external illuminance information surrounding the electronic device from an illuminance sensor, and
change the setting of the display screen during the call to a first setting value based on the detected illuminance information.

17. The electronic device of claim 16, wherein the setting of the display screen includes screen brightness, resolution, font type, font color, or font size.

18. The electronic device of claim 11, further comprising an illuminance sensor;
wherein the processor is further configured to:
detect external illuminance information surrounding the electronic device using the illuminance sensor,
determine whether the detected illuminance information falls within a first range or a second range, and
when the illuminance information falls within the first range, switch the operation mode during the call to a first mode, and
when the illuminance information falls within the second range, switch the operation mode during the call to a second mode.

19. The electronic device of claim 18, wherein switching to the first mode is switching from a video mode to a voice mode based on the illuminance information, and switching to the second mode is switching from the voice mode to the video mode based on the illuminance information.

20. The electronic device of claim 11, wherein the processor is further configured to:
determine whether the bio-signal is in a normal range; and
automatically initiate an emergency call if the bio-signal is not in the normal range.

21. The electronic device of claim 11, further comprising other sensor functionally connected to the processor;
wherein the processor is further configured to:
obtain motion information related to the electronic device using the at least one biometric sensor or the other sensor,
determine whether the obtained motion information falls within a first range or a second range, and
when the motion information falls within the first range, switch the operation mode of the electronic device to a speaker, and when the motion information falls within the second range, switch to a receiver mode.

22. A non-transitory storage medium storing instructions executed by at least one processor, the instructions being set to allow the at least one processor to perform at least one operation including:
during a phone call in progress between an electronic device and another electronic device, sensing a signal using at least one biometric sensor of an electronic device;
determining whether a bio-signal is detected from the sensed signal; and
controlling an operation mode related to the phone call of the electronic device by changing a setting of at least one of a speaker or a display screen of the electronic device, based at least in part on the determination of whether the bio-signal being detected.

* * * * *